United States Patent
Choi et al.

(10) Patent No.: US 12,555,775 B2
(45) Date of Patent: Feb. 17, 2026

(54) COMPOSITE CATHODE ACTIVE MATERIAL FOR ALL-SOLID-STATE BATTERY, PREPARATION METHOD THEREOF, CATHODE LAYER FOR ALL-SOLID-STATE BATTERY, AND ALL-SOLID-STATE BATTERY INCLUDING THE CATHODE LAYER

(71) Applicant: SAMSUNG SDI CO., LTD., Yongin-si (KR)

(72) Inventors: Byungjin Choi, Yongin-si (KR); Suk-Gi Hong, Yongin-si (KR); Youngsoo Kim, Yongin-si (KR); Donghee Yeon, Yongin-si (KR); Pilsang Yun, Yongin-si (KR); Sangil Han, Yongin-si (KR)

(73) Assignee: SAMSUNG SDI CO., LTD., Yongin-si (KR)

(*) Notice: Subject to any disclaimer, the term of this patent is extended or adjusted under 35 U.S.C. 154(b) by 611 days.

(21) Appl. No.: 17/708,303

(22) Filed: Mar. 30, 2022

(65) Prior Publication Data

US 2022/0328809 A1    Oct. 13, 2022

(30) Foreign Application Priority Data

Apr. 2, 2021 (KR) .................. 10-2021-0043503

(51) Int. Cl.
*H01M 4/36* (2006.01)
*C01G 23/04* (2006.01)
(Continued)

(52) U.S. Cl.
CPC ............ *H01M 4/366* (2013.01); *C01G 23/04* (2013.01); *C01G 53/50* (2013.01); *H01M 4/382* (2013.01);
(Continued)

(58) Field of Classification Search
None
See application file for complete search history.

(56) References Cited

U.S. PATENT DOCUMENTS

| 11,217,785 B2 | 1/2022 | Ito et al. |
| 2014/0178768 A1 | 6/2014 | Uchiyama et al. |

(Continued)

FOREIGN PATENT DOCUMENTS

| CN | 101118962 B | 5/2010 |
| EP | 3712989 A1 | 9/2020 |

(Continued)

OTHER PUBLICATIONS

Tian, L., Yuan, H., Shao, Q. et al. Synergistic effect of Li2MgTi3O8 coating layer with dual ionic surface doping to improve electrochemical performance of LiNi0.6Co0.2Mn0.2O2 cathode materials. Ionics 26, 4937-4948 (2020). (Year: 2020).*

(Continued)

*Primary Examiner* — Alix E Eggerding
(74) *Attorney, Agent, or Firm* — Lee IP Law, P.C.

(57) ABSTRACT

A composite cathode active material, a preparation method thereof, a cathode layer for an all-solid-state battery, and an all-solid-state battery including the cathode layer, the composite cathode active material for the all-solid-state battery including a secondary particle including a plurality of primary particles; and a buffer layer on a surface of the secondary particle, wherein the secondary particle includes a nickel lithium transition metal oxide represented by Formula 1, and the buffer layer includes a metal oxide represented by Formula 2, $Li_aNi_{1-b}M_bO_2$    Formula 1

$Li_xA_{y-1}E_{y2}O_z$.    Formula 2

15 Claims, 5 Drawing Sheets

(51) Int. Cl.

| | | |
|---|---|---|
| *C01G 53/50* | (2025.01) | |
| *H01M 4/38* | (2006.01) | |
| *H01M 4/40* | (2006.01) | |
| *H01M 4/505* | (2010.01) | |
| *H01M 4/525* | (2010.01) | |
| *H01M 4/62* | (2006.01) | |
| *H01M 10/0525* | (2010.01) | |
| *H01M 10/0562* | (2010.01) | |
| *H01M 10/0585* | (2010.01) | |
| *H01M 4/02* | (2006.01) | |

(52) U.S. Cl.
CPC .......... *H01M 4/405* (2013.01); *H01M 4/505* (2013.01); *H01M 4/525* (2013.01); *H01M 4/628* (2013.01); *H01M 10/0525* (2013.01); *H01M 10/0562* (2013.01); *H01M 10/0585* (2013.01); *H01M 2004/021* (2013.01); *H01M 2300/0068* (2013.01)

(56) References Cited

U.S. PATENT DOCUMENTS

| | | | |
|---|---|---|---|
| 2017/0117535 A1* | 4/2017 | Yoon | H01M 4/1391 |
| 2018/0090782 A1* | 3/2018 | Choi | H01M 4/62 |
| 2018/0212233 A1 | 7/2018 | Ito et al. | |
| 2018/0219219 A1 | 8/2018 | Ito et al. | |
| 2018/0323435 A1 | 11/2018 | Lim et al. | |
| 2020/0112024 A1 | 4/2020 | Shin et al. | |
| 2020/0136178 A1 | 4/2020 | Ku et al. | |
| 2021/0151754 A1 | 5/2021 | Baek et al. | |
| 2022/0231277 A1* | 7/2022 | Procter | H01M 4/505 |
| 2022/0293921 A1 | 9/2022 | Lim | |
| 2022/0328823 A1 | 10/2022 | Choi et al. | |
| 2022/0328835 A1 | 10/2022 | Kim et al. | |
| 2023/0223588 A1* | 7/2023 | Lee | H01M 4/622 |
| | | | 429/306 |
| 2023/0335748 A1* | 10/2023 | Chen | H01M 4/134 |
| 2024/0097117 A1 | 3/2024 | Hong et al. | |
| 2025/0140848 A1 | 5/2025 | Choi | |
| 2025/0183293 A1 | 6/2025 | Doo | |
| 2025/0192158 A1 | 6/2025 | Kang | |

FOREIGN PATENT DOCUMENTS

| | | |
|---|---|---|
| JP | 5195975 B2 | 2/2013 |
| JP | 2018-120705 A | 8/2018 |
| JP | 2020-071948 A | 5/2020 |
| KR | 2016-0129731 A | 11/2016 |
| KR | 10-2018-0076275 A | 7/2018 |
| KR | 2018-0087102 A | 8/2018 |
| KR | 10-2018-0123369 A | 11/2018 |
| KR | 10-2020-0038661 A | 4/2020 |
| KR | 2020-0046485 A | 5/2020 |
| KR | 2020-0050005 A | 5/2020 |
| KR | 10-2022-0137425 A | 10/2022 |
| KR | 10-2022-0137427 A | 10/2022 |

OTHER PUBLICATIONS

Materials Data on LiCoO2 by Materials Project (DOI: 10.17188/1705454).
Materials Data on LiNiO2 by Materials Project (DOI: 10.17188/1279355).
Materials Data on Li2TiO3 by Materials Project (DOI: 10.17188/1291255).
Materials Data on Li2MgTi3O8 by Materials Project (DOI: 10.17188/1302658).
Materials Data on Li2Ti3ZnO8 by Materials Project (DOI: 10.17188/1302666).
Materials Data on LiTiPO5 by Materials Project (DOI: 10.17188/1272686).
Becker et al: "Surface modification of Ni-rich . . . " Applied Materials May 2, 2019.
European Search Report dated Aug. 2, 2022.
Provisional double patenting rejection over claims of the above-identified application; USPTO Office action mailed Jan. 3, 2025, in U.S. Appl. No. 17/708,267.
U.S. Office action dated May 22, 2025, received in co pending related U.S. Appl. No. 17/708,267.
U.S. Notice of Allowance received in co-pending related U.S. Appl. No. 17/708,267, mailed Aug. 1, 2025.
Korean Office action dated Aug. 22, 2025, KR Application No. 10-2021-0043504.
Korean Office action dated Aug. 22, 2025, KR Application No. 10-2021-0043503.

* cited by examiner

COMPOSITE CATHODE ACTIVE MATERIAL FOR ALL-SOLID-STATE BATTERY, PREPARATION METHOD THEREOF, CATHODE LAYER FOR ALL-SOLID-STATE BATTERY, AND ALL-SOLID-STATE BATTERY INCLUDING THE CATHODE LAYER

CROSS-REFERENCE TO RELATED APPLICATION

This application is based on and claims priority under 35 U.S.C. § 119 to Korean Patent Application No. 10-2021-0043503, filed on Apr. 2, 2021, in the Korean Intellectual Property Office, the disclosure of which is incorporated by reference herein in its entirety.

BACKGROUND

1. Field

Embodiments relate to a composite cathode active material for an all-solid-state battery, a preparation method thereof, a cathode layer for an all-solid-state battery, and an all-solid-state battery including the cathode layer.

2. Description of the Related Art

Recently, the development of batteries with high energy density and safety has been actively carried out in response to industrial demands. For example, lithium-ion batteries may be put to practical use not only in the fields of information-related devices and communication devices, but also in the fields of automobiles. In the fields of automobiles, safety is especially considered important as being related to life.

SUMMARY

The embodiments may be realized by providing a composite cathode active material for an all-solid-state battery that includes a sulfide solid electrolyte, the composite cathode active material including a secondary particle including a plurality of primary particles; and a buffer layer on a surface of the secondary particle, wherein the secondary particle includes a nickel lithium transition metal oxide represented by Formula 1, and the buffer layer includes a metal oxide represented by Formula 2, $$Li_aNi_{1-b}M_bO_2 \quad \text{Formula 1}$$

in Formula 1, M is cobalt (Co), manganese (Mn), aluminum (Al), or a combination thereof, and a and b satisfy the following relations: $0.95 \leq a \leq 1.10$, $0 < b < 0.5$, $$Li_xA_{y1}E_{y2}O_z \quad \text{Formula 2}$$

in Formula 2, x, y1, y2, and z satisfy the following relations: $0 \leq x \leq 3$, $0 \leq y1 \leq 4$, $0 \leq y2 \leq 4$, $0 < z \leq 8$, and both y1 and y2 are not simultaneously 0, A is titanium (Ti), silicon (Si), zirconium (Zr), niobium (Nb), boron (B), lanthanum (La), or a combination thereof, and E is magnesium (Mg), zinc (Zn), phosphorus (P), Molybdenum (Mo), germanium (Ge), barium (Ba), tungsten (W), aluminum (Al), sodium (Na), vanadium (V), arsenic (As), or a combination thereof.

In the metal oxide represented by Formula 2, an amount of A may be greater than an amount of E.

The metal oxide represented by Formula 2 may be a compound represented by Formula 2-1, a compound represented by Formula 2-2, a compound represented by Formula 2-3, or a compound represented by Formula 2-4, $$Li_xMg_{y1}Ti_{y2}O_z \quad \text{Formula 2-1}$$

in Formula 2-1, x, y1, y2, and z may satisfy the following relations: $1 \leq x \leq 3$, $1 \leq y1 \leq 4$, $1 \leq y2 \leq 4$, and $0 < z \leq 8$, $$Li_xA1_{y1}Zn_{y2}O_z \quad \text{Formula 2-2}$$

in Formula 2-2, A1 may be Ti, Zr, or a combination thereof, and x, y1, y2, and z may satisfy the following relations: $1 \leq x \leq 3$, $1 \leq y1 \leq 4$, $1 \leq y2 \leq 4$, and $0 < z \leq 8$, $$Li_xA1_{y1}P_{y2}O_z \quad \text{Formula 2-3}$$

in Formula 2-3, A1 may be Ti, Zr, or a combination thereof, and x, y1, y2, and z may satisfy the following relations: $1 \leq x \leq 3$, $1 \leq y1 \leq 4$, $1 \leq y2 \leq 4$, and $0 < z \leq 8$.

The metal oxide represented by Formula 2 may be a compound represented by Formula 2-2 or a compound represented by Formula 2-3, and A1 in Formulae 2-2 and 2-3 may be Ti.

The metal oxide represented by Formula 2 may include $Li_2MgTi_3O_8$, $Li_2Ti_3ZnO_8$, $LiTiPO_5$, $Li_2Zr_3ZnO_8$, $LiZrPO5$, $Li_2Ti_2(PO_4)_3$, $Li_2Ti_6Zn_3O_{16}$, $Li_2Ti_3MnO_8$, $Li_2Ti_3VO_8$, $LiTiVO_4$, $Li_2Ti_3CoO_8$, $Li_2Ti_3NiO_8$, $Li_2TiSiO_5$, $LiTiCrO_4$, or a combination thereof.

The nickel lithium transition metal oxide represented by Formula 1 may have a layered crystal structure, and the metal oxide represented by Formula 2 may have a cubic crystal structure or an orthorhombic crystal structure.

The metal oxide represented by Formula 2 may be included in the composite cathode active material in an amount of about 0.01 mol % to about 5 mol % based on 100 mol % of the composite cathode active material.

According to inductively coupled plasma (ICP) analysis for the composite cathode active material, the composite cathode active material may include Ti in an amount of about 0.1 mol % to about 5 mol %, Mg in an amount of about 0.01 mol % to about 5 mol %, Zn in an amount of about 0.1 mol % to about 5 mol %, and P in an amount of about 0.05 mol % to about 5 mol %, all mol % being based on 100 mol % of the composite cathode active material.

The nickel lithium transition metal represented by Formula 1 may be a compound represented by Formula 1-1, a compound represented by Formula 1-2, or a combination thereof:

$$Li_aNi_{1-b1-b2}Co_{b1}Mn_{b2}O_2 \quad \text{Formula 1-1}$$

in Formula 1-1, a, b1, and b2 may satisfy the following relations: $0.95 \leq a \leq 1.10$, $0 \leq b1+b2 < 0.5$, $0 < b1 < 0.2$, and $0 < b2 < 0.2$, and $$Li_aN_{1-b1-b2}Co_{b1}Al_{b2}O_2 \quad \text{Formula 1-2}$$

in Formula 1-1, a, b1, and b2 may satisfy the following relations: $0.95 \leq a \leq 1.10$, $0 < b1+b2 < 0.5$, $0 < b1 < 0.2$, and $0 < b2 < 0.05$.

The embodiments may be realized by providing a cathode layer for an all-solid-state battery, comprising the composite cathode active material according to an embodiment.

The embodiments may be realized by providing an all-solid-state battery including a cathode layer; an anode layer; and a solid electrolyte layer therebetween, wherein the cathode layer includes the composite cathode active material according to an embodiment.

The anode layer may include an anode current collector and a first anode active material layer, the all-solid-state battery may further include a second anode active material layer on the first anode active material layer, between the anode current collector and the first anode active material layer, or a combination thereof, and the second anode active material layer may include lithium or a lithium alloy.

The anode layer may include an anode current collector and a first anode active material layer, and the all-solid-state battery may further include a carbon layer between the first anode active material layer and the solid electrolyte layer.

The solid electrolyte layer may include a sulfide solid electrolyte, and the sulfide solid electrolyte may include $Li_2S$—$P_2S_5$, $Li_2S$—$P_2S_5$—LiX, in which X is a halogen element, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, in which m and n are positive numbers, and Z is germanium (Ge), Zn, or gallium (Ga), $Li_2S$—$GeS_2$, $Li_2S$—$SiS_2$—$Li_3PO_4$, $Li_2S$—$SiS_2$—$Li_pMO_q$, in which p and q are positive numbers, and M is P, Si, Ge, B, Al, Ga, or indium (In), $Li_{7-x}PS_{6-x}Cl_x$, in which $0 \le x \le 2$, $Li_{7-x}PS_{6-x}Br_x$, in which $0 \le x \le 2$, or $Li_{7-x}PS_{6-x}I_x$ in which $0 \le x \le 2$.

The solid electrolyte layer may include a sulfide solid electrolyte, and the sulfide solid electrolyte may be an argyrodite-type solid electrolyte including $Li_6PS_5Cl$, $Li_6PS_5Br$, or $Li_6PS_5I$.

The embodiments may be realized by providing a method of preparing the composite cathode active material as claimed in claim 1, the method including mixing a nickel lithium transition metal oxide represented by Formula 1 and a precursor of a metal oxide represented by Formula 2 to obtain a composite cathode active material composition; and performing a reaction on the composite positive electrode active material composition, and drying and heat-treating the reaction product to a prepare the composite cathode active material, $$Li_aNi_{1-b}M_bO_2 \qquad \text{Formula 1}$$

wherein, in Formula 1, M may be cobalt (Co), manganese (Mn), aluminum (Al), or a combination thereof, and a and b may satisfy the following relations: $0.95 \le a \le 1.10$, $0 < b < 0.5$, and $$Li_xA_{y1}E_{y2}O_z \qquad \text{Formula 2}$$

wherein, in Formula 2, x, y1, y2, and z may satisfy the following relations: $0 \le x \le 3$, $0 \le y1 \le 4$, $0 \le y2 \le 4$, and $0 < z \le 8$, and y1 and y2 are not both simultaneously 0, A may be Ti, Si, Zr, Nb, B, La, or a combination thereof, and E may be Mg, Zn, P, Mo, Ge, Ba, W, Al, Na, V, As, or a combination thereof.

The heat treatment may be performed at a temperature in a range of about 300° C. to about 700° C. under an oxidizing atmosphere.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
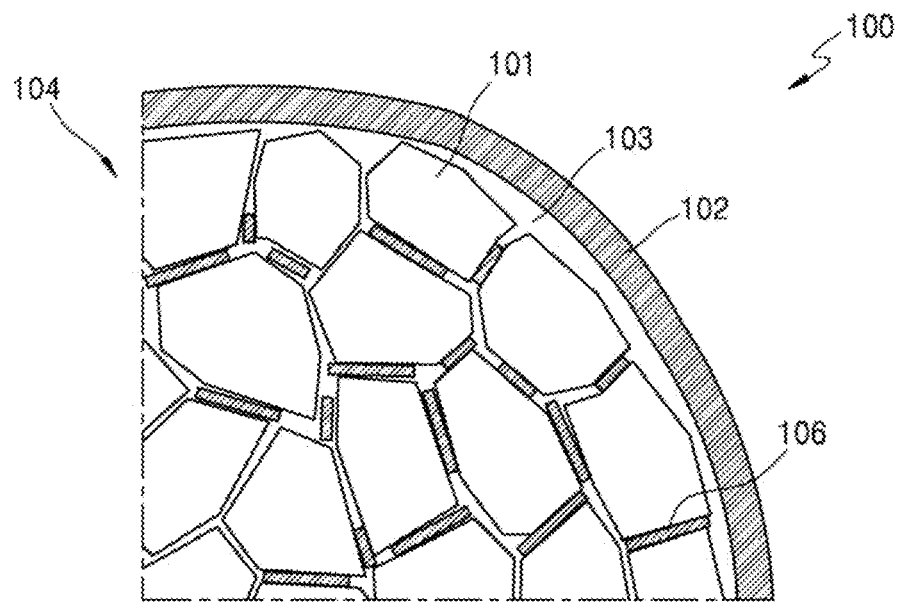
FIG. 1 is a schematic diagram of a partial structure of a composite cathode active material according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" are not exclusive terms, and include any and all combinations of one or more of the associated listed items. Expressions such as "at least one of," when preceding a list of elements, modify the entire list of elements and do not modify the individual elements of the list.

Hereinafter, a composite cathode active material for an all-solid-state battery according to embodiments, a preparation method thereof, and an all-solid-state battery including the composite cathode active material will be described in more detail.

As a solid electrolyte for an all-solid-state battery, a sulfide solid electrolyte may be used. However, some sulfide solid electrolytes may have deteriorated performance due to a reaction with a cathode.

According to an embodiment, in order to address the potential for an increase in interfacial resistance due to a side reaction between a cathode and the sulfide solid electrolyte, a composite cathode active material having a buffer layer may be used.

The composite cathode active material including the sulfide solid electrolyte according to an embodiment for an all-solid-state battery may include, e.g., a secondary particle including a plurality of primary particles, and a buffer layer on a surface of the secondary particle. The secondary particle may include, e.g., a nickel lithium transition metal oxide represented by Formula 1, and the buffer layer may include, e.g., a metal oxide represented by Formula 2.

$$Li_zNi_{1-b}M_bO_2 \qquad \text{Formula 2}$$

In Formula 1, a and b may satisfy the following relations: $0.95 \le a \le 1.10$, $0 < b < 0.5$. M may be, e.g., cobalt (Co), manganese (Mn), aluminum (Al), or a combination thereof.

$$Li_xA_{y1}E_{y2}O_z \qquad \text{Formula 2}$$

In Formula 2, x, y1, y2, and z may satisfy the following relations: $0 \le x \le 3$, $0 \le y1 \le 4$, $0 \le y2 \le 4$, $0 < z \le 8$, and y1 and y2 are not both simultaneously 0 (e.g., y1+y2>0).

A may be, e.g., titanium (Ti), silicon (Si), zirconium (Zr), niobium (Nb), boron (B), lanthanum (La), or a combination thereof.

E may be different from A, and may be, e.g., magnesium (Mg), zinc (Zn), phosphorus (P), Molybdenum (Mo), germanium (Ge), barium (Ba), tungsten (W), aluminum (Al), sodium (Na), vanadium (V), arsenic (As), or a combination thereof.

In an implementation, the metal oxide of Formula 2 may also be included at a grain boundary in a space among or between the plurality of primary particles.

The buffer layer may be, e.g., a single layer.

In an implementation, in the metal oxide of Formula 2, an amount of A may be greater than that of E. Under these conditions, a composite cathode active material having excellent stability at a high voltage and reaction stability with respect to the sulfide solid electrolyte may be obtained. In an implementation, the amounts of A and E may be confirmed by inductively coupled plasma spectrometry (ICPS).

Referring to FIG. 1, a composite cathode active material 100 may include, e.g., a secondary particle 104 including (e.g., formed of) a plurality of primary particles 101; and a buffer layer 102 on a surface of the secondary particle 104. The plurality of primary particles 101 may include, e.g., a nickel lithium transition metal oxide represented by Formula 1 having a layered structure. The buffer layer 102 may have a crystal structure different from the nickel lithium transition metal oxide, and may include, e.g., the metal oxide of Formula 2. At a grain boundary 103 in a space among or between the plurality of primary particles 101 (e.g., within the secondary particle 104), the metal oxide 106 of Formula 2 may also be included in the same manner as being included on the surface of the secondary particle 104. In an implementation, an amount of the metal oxide 106 of Formula 2 present at the grain boundary 103 may be smaller than that of the metal oxide of Formula 2 on the surface of the secondary particle 104.

In the composite cathode active material according to an embodiment, due to the presence of the buffer layer 102 including the metal oxide of Formula 2, an increase in interfacial resistance by a side reaction between a cathode and the sulfide solid electrolyte may be addressed (e.g., prevented), thereby improving stability at a high voltage and reaction stability with respect to the sulfide solid electrolyte. In an implementation, the metal oxide of Formula 2 may have excellent electrochemical stability at a high voltage and excellent reaction stability with respect to the sulfide solid electrolyte. The metal oxide of Formula 2 may have a high electrochemical window and a high redox potential, resulting in increased structural stability at a high voltage state on a cathode surface. In this regard, the reactivity to the sulfide solid electrolyte may become low, thereby suppressing the electrolyte decomposition.

The sulfide solid electrolyte may be, e.g., an argyrodite-type sulfide solid electrolyte.

In an implementation, the metal oxide of Formula 2 may be, e.g., a compound represented by Formula 2-1, a compound represented by Formula 2-2, a compound represented by Formula 2-3, or a compound represented by Formula 2-4.

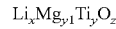    Formula 2-1

In Formula 2-1, x, y1, y2, and z may satisfy the following relations: $1 \leq x \leq 3$, $1 \leq y1 \leq 4$, $1 \leq y2 \leq 4$, and $0 < z \leq 8$.

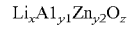    Formula 2-2

In Formula 2-2, A1 may be, e.g., Ti, Zr, or a combination thereof. x, y1, y2, and z may satisfy the following relations: $1 \leq x \leq 3$, $1 \leq y1 \leq 4$, $1 \leq y2 \leq 4$, and $0 < z \leq 8$.

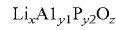    Formula 2-3

In Formula 2-3, A1 may be, e.g., Ti, Zr, or a combination thereof. x, y1, y2, and z may satisfy the following relations: $1 \leq x \leq 3$, $1 \leq y1 \leq 4$, $1 \leq y2 \leq 4$, and $0 < z \leq 8$.

In an implementation, in Formulae 2-2 and 2-3, A1 may be, e.g., Ti.

In an implementation, in Formulae 2-1 and 2-2, x, y1, y2, and z may satisfy the following relations: $1.5 \leq x \leq 2.5$, $1 \leq y1 \leq 2$, $2 \leq y2 \leq 3$, and $6 < z \leq 8$.

In an implementation, in Formula 2-3, x, y1, y2, and z may satisfy the following relations: $1 \leq x \leq 2$, $1 \leq y1 \leq 3$, $1 \leq y2 \leq 2$, and $4 < z \leq 8$.

In an implementation, the metal oxide of Formula 2 may include, e.g., $Li_2MgTi_3O_8$, $Li_2Ti_3ZnO_8$, $LiTiPO_5$, $Li_2Zr_3ZnO_8$, $LiZrPO5$, $Li_2Ti_2(PO_4)_3$, $Li_2Ti_6Zn_3O_{16}$, $Li_2Ti_3MnO_8$, $Li_2Ti_3VO_8$, $LiTiVO_4$, $Li_2Ti_3CoO_8$, $Li_2Ti_3NiO_8$, $Li_2TiSiO_5$, $LiTiCrO_4$, or a combination thereof.

In an implementation, the nickel lithium transition metal oxide of Formula 1 may have a layered crystal structure, and the metal oxide of Formula 2 may have a cubic crystal structure, an orthorhombic crystal structure, or the like.

In an implementation, among the metal oxides of Formula 2, $Li_2MgTi_3O_8$, $Li_2Ti_3ZnO_8$ may have a cubic crystal structure and a P2_13 space group. In an implementation, among the metal oxides of Formula 2, $LiTiPO_5$ may have an orthorhombic crystal structure and a Pnma space group.

In an implementation, an amount of the metal oxide of Formula 2 may be in a range of, e.g., about 0.01 mol % to about 5 mol %, about 0.02 mol % to about 3.5 mol %, about 0.03 mol % to about 2 mol %, about 0.05 mol % to about 2 mol %, about 0.06 mol % to about 0.15 mol %, or about 0.067 mol % to about 0.12 mol %, based on 100 mol % of the composite cathode active material. Here, the term "100 mol % of the composite cathode active material" as used herein refers to a total amount (100 mol %) of the nickel lithium transition metal oxide of Formula 1, and the metal oxide of Formula 2. When the amounts of the metal oxides are within the ranges above, the reaction stability with respect to the sulfide solid electrolyte and the high-voltage stability may be improved.

In an implementation, a thickness of the buffer layer 102 may be, e.g., about 1 μm or less, about 500 nm or less, about 100 nm or less, about 50 nm or less, or in a range of about 1 nm to about 40 nm. In an implementation, the buffer layer 102 may cover about 50 vol % or more, about 55 vol % or more, or about 55 vol % to 60 vol % of the surface of a lithium transition metal oxide having a layered crystal structure. When having such a structure, a side reaction between a cathode and the sulfide solid electrolyte may be substantially reduced or effectively minimized or effectively blocked.

In an implementation, when ICPS is performed on the composite cathode active material according to an embodiment, an amount of Ti may be in a range of, e.g., about 0.1 mol % to about 5 mol %, about 0.2 mol % to about 4 mol %, or about 0.22 mol % to 3 mol %, based on 100 mol % of the composite cathode active material, an amount of Mg may be in a range of, e.g., about 0.01 mol % to about 5 mol %, about 0.02 mol % to about 4 mol %, or about 0.05 mol % to about 3.5 mol % based on 100 mol % of the composite cathode active material, an amount of Zn may be in a range of, e.g., about 0.1 mol % to about 5 mol % or about 0.3 mol % to about 3.5 mol % based on 100 mol % of the composite cathode active material, and an amount of P may be in a range of, e.g., about 0.05 mol % to about 5 mol % or about 0.1 mol % to about 3.5 mol % based on 100 mol % of the composite cathode active material.

In an implementation, the nickel lithium transition metal of Formula 1 may be a compound represented by Formula 1-1, a compound represented by Formula 1-2, or a combination thereof.

$$Li_aNi_{1-b1-b2}Co_{b1}Mn_{b2}O_2 \qquad \text{Formula 1-1}$$

In Formula 1-1, a, b1, and b2 may satisfy the following relations: 0.95≤a≤1.10, 0<b1+b2<0.5, 0<b1<0.2, and 0<b2<0.2.

$$Li_aNi_{1-b1-b2}Co_{b1}Al_{b2}O_2 \qquad \text{Formula 1-2}$$

In Formula 1-2, a, b1, and b2 may satisfy the following relations: 0.95≤a≤1.10, 0<b1+b2<0.5, 0<b1<0.2, and 0<b2<0.05.

In an implementation, the nickel lithium transition metal oxide may include, e.g., $LiNi_{0.9}Co_{0.07}Mn_{0.03}O_2$, $LiNi_{0.9}Co_{0.07}Al_{0.03}O_2$ $Li_{1.03}[Ni_{0.91}Co_{0.06}Mn_{0.03}]O_2$, $Li_{1.03}[Ni_{0.88}Co_{0.08}Mn_{0.04}]O_2$, $Li_{1.03}[Ni_{0.8}Co_{0.15}Mn_{0.05}]O_2$, $Li_{1.03}[Ni_{0.85}Co_{0.10}Mn_{0.05}]O_2$, $Li_{1.03}[Ni_{0.91}Co_{0.05}Mn_{0.04}]O_2$, $Li_{1.05}[Ni_{0.91}Co_{0.06}Mn_{0.03}]O_2$, $Li_{1.06}[Ni_{0.91}Co_{0.06}Mn_{0.03}]O_2$, $Li_{1.06}[Ni_{0.88}Co_{0.08}Mn_{0.04}]O_2$, $Li_{1.06}[Ni_{0.8}Co_{0.15}Mn_{0.05}]O_2$, $Li_{1.06}[Ni_{0.85}Co_{0.10}Mn_{0.05}]O_2$, $Li_{1.06}[NiO_{0.91}Co_{0.05}Mn_{0.04}]O_2$, $Li_{1.09}[Ni_{0.91}Co_{0.06}Mn_{0.03}]O_2$, $Li_{1.09}[Ni_{0.88}Co_{0.08}Mn_{0.04}]O_2$, $Li_{1.09}[Ni_{0.8}Co_{0.15}Mn_{0.05}]O_2$, $Li_{1.09}[Ni_{0.85}Co_{0.10}Mn_{0.05}]O_2$, $Li_{1.09}[Ni_{0.91}Co_{0.05}Mn_{0.04}]O_2$, $LiNi_{0.91}Co_{0.06}Al_{0.03}O_2$, $LiNi_{0.88}Co_{0.08}Co_{0.08}Al_{0.04}O_2$, $LiNi_{0.8}Co_{0.15}Al_{0.05}O_2$, $LiNi_{0.85}Co_{0.10}Al_{0.05}O_2$, $LiNi_{0.91}Co_{0.05}Al_{0.04}O_2$, or the like.

In an implementation, the sulfide solid electrolyte may include, e.g., $Li_2S$—$P_2S_5$, $Li_2S$—$P_2S_5$—LiX (where X is a halogen atom), $Li_2$—$P_2S_5$—$Li_2$), $Li_2S'P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_wS$—$SiS_2$—$B_2S_3$—LiI, $Li_2S$—$SiS_w$—$P_2S_5$—LiI, $Li_2S$—$B_2S_3$, $Li_2S$—$P_2S_5$—$Z_mS_n$. (where m and n are positive numbers, and Z is Ge, Zn, or Ga), $Li_2S$—$GeS_2$, $Li_2S$—$SiS_2$—$Li_3PO_4$, $Li_2S$—$SiS_2$—$Li_pMO_q$ (where p and q are positive numbers, and M is P, Si, Ge, B, Al, Ga, or In), $Li_{7-x}PS_{6-x}I_x$ (where 0≤x≤2), $Li_{7-x}PS_{6-x}Cl_x$, (where 0≤x≤2). $Li_{7-x}PS_{6-x}Br_x$, (where 0≤x≤2) and $Li_{7-x}PS_{6-x}I_x$ (where 0≤x≤2). In an implementation, the sulfide solid electrolyte may be an argyrodite-type solid electrolyte including, e.g., $Li_6PS_5Cl$, $Li_6PS_5Br$, or $Li_6PS_5I$.

Hereinafter, a method of preparing the composite cathode active material according to an embodiment will be described as follows.

First, a composition for forming a cathode active material layer may be obtained by mixing the nickel lithium transition metal oxide of Formula 1 and a precursor of the metal oxide of Formula 2.

The nickel lithium transition metal oxide of Formula 1 may be prepared according to a suitable preparation method.

$$Li_aNi_{1-b}M_bO_2 \qquad \text{Formula 1}$$

In Formula 1, a and b may satisfy the following relations: 0.95≤a≤1.10, 0<b<0.5. M may be, e.g., Co, Mn, Al, or a combination thereof.

$$Li_xA_{y1}E_{y2}O_z \qquad \text{Formula 2}$$

In Formula 2, x, y1, y2, and z may satisfy the following relations: 0≤x≤3, 0≤y1≤4, 0≤y2≤4, 0<z≤8, and y1 and y2 are not both simultaneously 0.

A may be, e.g., Ti, Si, Zr, Nb, B, La, or a combination thereof.

E may be, e.g., Mg, Zn, P, Mo, Ge, Ba, W, Al, Na, V, As, or a combination thereof.

The precursor of the metal oxide of Formula 2 may include a lithium precursor, an A-containing precursor, and a E-containing precursor. In an implementation, the lithium precursor may include, e.g., lithium hydroxide, lithium carbonate, lithium methoxide, lithium oxide, lithium chloride, lithium sulfate, or the like. In an implementation, the A-containing precursor may include, e.g., A element-containing alkoxide, A element-containing carbonate, A element-containing chloride, A element-containing phosphate, A element-containing hydroxide, A element-containing nitrate, A element-containing hydroxide, or a combination thereof. In an implementation, the A-containing precursor may include, e.g., titanium butoxide, titanium isopropoxide, TEOS (Tetraethylorthosilicate), zirconium isopropoxide, zirconium butoxide, zirconium ethoxide, zirconium chloride, lanthanum chloride, A-containing acetate, A-containing oxide, or the like. In an implementation, the E-containing precursor may include E element-containing alkoxide, E element-containing carbonate E element-containing chloride, E element-containing phosphate, E element-containing hydroxide, E element-containing nitrate, E element-containing hydroxide, or a combination thereof. In an implementation, the E element-containing precursor may include, e.g., magnesium chloride, magnesium nitrate, zinc chloride, zinc nitrate, E-containing acetate, E-containing oxide, or a combination thereof. In an implementation, a phosphorus precursor may include, e.g., $(NH_4)_2HPO_4$, $(NH_4)H_2PO_4$, $LiPO_3$, $LiH_2PO_4$, $Li_3PO_4$, trimethyl phosphate, or the like.

A solvent may be added to the composition, and the solvent may include, e.g., acetone, ethanol, water, ethylene glycol, isopropanol, or a combination thereof. An amount of the solvent may be, e.g., about 50 parts by weight to about 1,000 parts by weight, or about 100 parts by weight to about 300 parts by weight, based on 100 parts by weight of a total weight of the precursors.

By stirring the composite cathode active material composition obtained according to the process described above, carrying out a reaction thereon, drying the reaction product, and performing a heat treatment process thereon, a desired composite cathode active material may be obtained. The reaction performed on the composite cathode active material may be a sol-gel reaction.

The drying may be performed at a temperature in a range of, e.g., about 100° C. to about 150° C. Although conditions vary depending on a drying temperature, the drying may be performed for, e.g., about 1 hour to about 3 hours. The solvent may be removed by the drying. The drying may be performed, e.g., in a convection oven at the temperature ranges above.

The heat treatment may be performed at a temperature in a range of, e.g., about 300° C. to about 700° C. under an oxidizing atmosphere. After the heat treatment, a buffer layer may be formed through a sol-gel reaction.

The reaction may be a sol-gel reaction.

In an implementation, when the temperature at which the heat treatment is performed is within the ranges above, a composite cathode active material in which the buffer layer is arranged through the sol-gel method may be obtained. If the heat treatment were to be performed at a temperature less than 200° C. or a temperature exceeding 700° C., a portion of the buffer layer containing the metal oxides may not be formed, thereby deteriorating the high-voltage stability and reaction stability with respect to the electrolyte. When the composite cathode active material layer is heat-treated at a temperature within the ranges described above, a cathode having improved high-voltage stability and reaction stability with respect to the sulfide solid electrolyte may be provided.

In an implementation, the time for the heat treatment may vary depending on the temperature of the heat treatment.

The heat treatment may be performed, e.g., for about 1 hour to about 20 hours, about 1 hour to about 10 hours, or about 2 hours to about 8 hours.

The term "conformal coating layer" as used herein may refer to a coating layer having excellent conformality. A conformal coating layer (also referred to as conformal coating or uniform coating) may refer to a coating layer having excellent conformal coating uniformity and surface coverage.

The term "conformality" as used herein may be defined as so-called step coverage, and may refer to i) a ratio (%) of a film formation rate on an x-axis and a film formation rate on a y-axis, or ii) a ratio of an average thickness of layers formed in a horizontal direction to an average thickness of layers formed in a vertical direction. The conformal coating layer may have conformality in a range of, e.g., about 80% to about 100%, about 82% to about 100%, about 83% to about 99%, about 85% to about 99%, or about 90% to about 95%. Here, the conformality may be observed through a scanning electron microscope (SEM).

The conformal coating layer may be a dense layer, and may be formed on the surface of the secondary particle and the grain boundary among the plurality of primary particles to help improve the surface morphology of the composite cathode active material. In this regard, the interface resistance between a cathode and the sulfide solid electrolyte may be effectively controlled to be reduced.

An oxidizing atmosphere may be carried out under oxygen or in the atmosphere.

The method of preparing the composite cathode active material of the present disclosure may be performed by the sol-gel reaction as described above, and thus unlike other preparation methods, the buffer layer may be formed as a conformal coating layer.

Another aspect of the present disclosure provides a cathode including the composite cathode active material according to an embodiment.

Another aspect of the present disclosure provides an all-solid-state battery including, e.g., a cathode layer; an anode layer; and a solid electrolyte layer between the cathode layer and the anode layer. The cathode layer may include the composite cathode active material layer according to an embodiment. Here, the all-solid-state battery may be, e.g., an all-solid-state secondary battery.

[All-Solid-State Battery]

Figure 2:
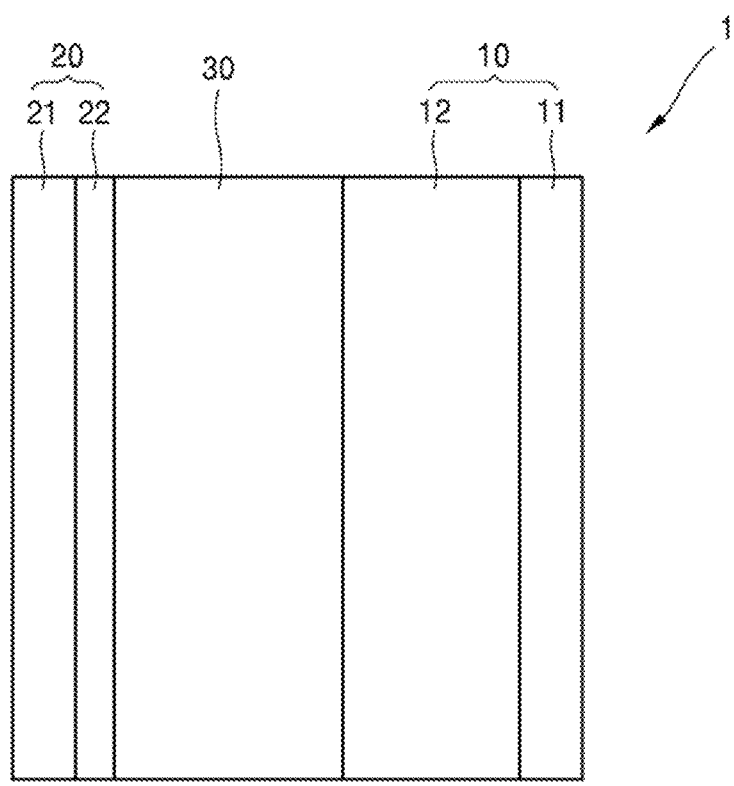
FIGS. 2 to 4 are each a schematic diagram of a structure of an all-solid-state battery according to another embodiment.

Referring to FIG. 2, an all-solid-state battery 1 may include, e.g., a cathode layer 10; an anode layer 20; and a solid electrolyte layer 30 between the cathode layer 10 and the anode layer 20.

The cathode layer 10 may include a cathode current collector 11 and a cathode active material layer 12 on the cathode current collector 11 The cathode active material layer 12 may include the composite cathode active material according to an embodiment, a binder, and a solid electrolyte. The solid electrolyte may be a sulfide solid electrolyte, an oxide solid electrolyte, or a combination thereof. In an implementation, the solid electrolyte may be an argyrodite-type sulfide solid electrolyte. In an implementation, the anode layer 20 may include an anode current collector 21 and an anode active material layer 22 on the anode current collector 21.

[Cathode layer: Cathode Current Collector]

The cathode current collector 11 may be, e.g., in the form of a plate or a foil, including indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. In an implementation, the cathode current collector 11 may be omitted.

In an implementation cathode current collector 11 may further include a carbon layer on one or both surfaces of a metal substrate. When the carbon layer is additionally located on the metal substrate, a metal of the metal substrate may be prevented from being corroded by a solid electrolyte included in the cathode layer 10, and the interfacial resistance between the cathode active material layer 12 and the cathode current collector 11 may be reduced. A thickness of the carbon layer may be, e.g., in a range of about 1 μm to about 5 μm. If the carbon layer were to be too thin, the contact between the metal substrate and the solid electrolyte may not be completely blocked. If the carbon layer were to be too thick, the energy density of the all-solid-state battery may be reduced. The carbon layer may include amorphous carbon, crystalline carbon, or the like.

[Cathode Layer: Cathode Active Material]

The cathode active material layer 12 may include, e.g., the composite cathode active material according to an embodiment, a solid electrolyte, a binder, and a solvent.

The cathode active material layer 12 may include a conductive material. The conductive material may be, e.g., graphite, carbon black (CB), acetylene black (AB), carbon nanofiber, or carbon nanotube.

The solid electrolyte included in the cathode layer 10 may be similar to or different from a solid electrolyte included in the solid electrolyte layer 30. Details on the solid electrolyte may be understood by referring to the solid electrolyte layer 30.

In an implementation, as the cathode active material, in addition to the composite cathode active material, a cathode active material capable of reversibly intercalating and deintercalating lithium ions may be further included. The cathode active material may include, e.g., a lithium transition metal oxide, such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, lithium iron phosphate, or the like, nickel sulfide, copper sulfide, lithium sulfide, iron oxide, vanadium oxide, or the like. A suitable material available as a cathode active material may be used. The cathode active material may be used alone or in a mixture of two or more materials.

The lithium transition metal oxide may include, e.g., $Li_aA_{1-b}B_bD_2$ (where $0.90 \le a \le 1$ and $0 \le b \le 0.5$); $Li_aE_{1-b}B_bO_{2-c}D_c$ (where $0.90 \le a \le 1$, $0 \le b \le 0.5$, and $0 \le c \le 0.05$); $LiE_{2-b}B_bO_{4-}D_c$ (where $0 \le b \le 0.5$ and $0 \le c \le 0.05$); $Li_aNi_{1-b-c}Co_bB_cD_\alpha$ (where $0.90 \le a \le 1$, $0 \le b \le 0.5$, $0 \le c \le 0.05$, and $0 < \alpha \le 2$); $Li_a Ni_{1-b-c}Co_bB_cO_{2-\alpha}F_\alpha$, (where $0.90 \le a \le 1$, $0 \le b \le 0.5$, $0 \le c \le 0.05$, and $0 < \alpha < 2$); $Li_aNi_{1-b-c}Co_bB_cO_{2-\alpha}F_2$ (where $0.90 \le a \le 1$, $0 \le b \le 0.5$, $0 \le c \le 0.05$, and $0 < \alpha < 2$); $Li_aNi_{1-b-c}Mn_bB_cD_\alpha$, (where $0.90 \le a \le 1$, $0 \le b \le 0.5$, $0 \le c \le 0.05$, and $0 < \alpha \le 2$); $Li_a Ni_{1-b-c}Mn_bB_cO_{2-\alpha}F_\alpha$ (where $0.90 \le a \le 1$, $0 \le b \le 0.5$, $0 \le c \le 0.05$, and $0 \le \alpha < 2$); $Li_aNi_{1-b-c}Mn_bB_cO_{2-\alpha}F_2$ (where $0.90 \le a \le 1$, $0 \le b \le 0.5$, $0 \le c \le 0.05$, and $0 < \alpha < 2$); $Li_aNi_bE_cG_dO_2$ (where $0.90 \le a \le 1$, $0 \le b \le 0.9$, $0 \le c \le 0.5$, and $0.001 \le d \le 0.1$); $Li_aNi_b Co_cMn_dGeO2$ (where $0.90 \le a \le 1$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1$ and $0.001 \le b \le 0.1$); $Li_aCoG_bO_2$ (where $0.90 \le a \le 1$ and $0.001 \le b \le 0.1$); $Li_aMnG_bO_2$ (where $0.90 \le a \le 1$ and $0.001 \le b \le 0.1$); $Li_aMn_2G_bO_4$ (where $0.90 \le a \le 1$ and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); and $LiFePO_4$. In the compounds represented by the formulae above, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof. A compound having a coating layer added to the surface of the compound described above may be also used, and a mixture of the compound described above and a compound having a coating layer added thereto may be also used. Such a coating layer added to the surface of the compound may include, e.g., a coating element compound such as an oxide of a coating element, hydroxide, oxyhydroxide of a coating element oxycarbonate of a coating element, or hydroxy carbonate of a coating element. Such a coating element compound of the coating layer may be amorphous or crystalline. The coating element included in the coating layer may include, e.g., Mg, Al, Co, K, Na, Ca, Si, Ti, V, Sn, Ge, Ga, B, As, Zr, or a mixture thereof. A method of forming a coating layer may not adversely affect the physical properties of the cathode active material. A coating method may include, e.g., spray coating, dipping, or the like.

The cathode active material may include, e.g., a lithium salt of a transition metal oxide having a layered rock salt type structure, among the lithium transition metal oxides described above. The term "layered rock salt type structure" as used herein may refer to, for example, a structure in which oxygen atomic layers and metal layers are alternatively arranged regularly in the <111> direction of a cubic rock salt type structure to form a two-dimensional plane by each of the atomic layers. The term "cubic rock salt type structure" as used herein refers to a NaCl type structure which is one type of crystal structures, and in detail, may refer to a structure in which a face centered cubic lattice (fcc) formed by respective anions and cations is misaligned from each other by ½ of the ridge of a unit lattice. The lithium transition metal oxide having such a layered rock salt type structure may be a ternary compound, such as $LiNi_xCo_yAl_zO_2$ (NCA) or $LiNi_xCo_yMn_xO_2$ (NCM) (where $0<x<1$, $0<y<1$, $0<z<1$, and $x+y+z=1$). When the cathode active material includes a ternary lithium transition metal oxide having the layered rock salt type, the all-solid-state secondary battery 1 may have further improved energy density and thermal stability.

The cathode active material may be covered by the coating layer as described above. For use as the coating layer, a suitable coating layer for a cathode active material of an all-solid-state secondary battery may be used. The coating layer may be, e.g., $Li_2)-ZrO_2$ (LZO) or the like.

When the cathode active material includes, e.g., Ni as the ternary lithium transition metal oxide such as NCA or NCM, the volume density of the all-solid-state battery 1 may increase to reduce the metal elution of the cathode active material in a charged state. Consequently, the cycle characteristics of the all-solid-state battery 1 may be improved.

The cathode active material may be in the form of, e.g., a globular or oval sphere. An average particle diameter of the cathode active material may be within a range suitable for the cathode active material of the all-solid-state battery 1. An amount of the cathode active material in the cathode 10 may be within a range suitable for the cathode of a conventional all-solid-state battery.

[Cathode Layer: Solid Electrolyte]

The cathode active material layer 12 may include, e.g., a solid electrolyte.

The cathode active material layer 12 may include, e.g., a sulfide solid electrolyte. The solid electrolyte included in the cathode layer 10 may be similar to or different from a solid electrolyte included in the solid electrolyte layer 30. Details on the solid electrolyte may be understood by referring to the solid electrolyte layer 30.

The solid electrolyte included in the cathode active material layer 12 may have a smaller value of an average particle diameter (D50) than the solid electrolyte included in the solid electrolyte layer 30. In an implementation, the average particle diameter D50 of the solid electrolyte included in the cathode active material layer 12 may be, e.g., about 90% or less, 80% or less, 70% or less, 60% or less, 50% or less, 40% or less, 30% or less, or 20% or less, of the particle diameter D50 of the solid electrolyte included in the solid electrolyte layer 30.

[Cathode Layer: Binder]

The cathode active material layer 12 may include a binder. The binder may include, e.g., polyvinylidene fluoride, styrene butadiene rubber (SBR), polytetrafluoroethylene, polyvinylidene fluoride, vinylidene fluoride/hexafluoropropylene copolymer, polyacrylonitrile, or polymethyl methacrylate.

[Cathode Layer: Conductive Material]

The cathode active material layer 12 may include a conductive material. The conductive material may include, e.g., graphite, CB, AB, ketjen black (KB), carbon fiber, metal powder, or the like.

[Cathode Layer: Other Additives]

In an implementation, the cathode layer 10 may further include, e.g., additives such as a filler, a coating agent, a dispersant, and an ion conductive auxiliary agent, in addition to the cathode active material, the solid electrolyte, the binder, and the cathode active material described above.

For use as a filler, a coating agent, a dispersant, an ion conductive auxiliary agent, or the like that may be included in the cathode layer 10, a suitable material for an electrode of an all-solid-state battery may be used.

[Solid Electrolyte Layer]

The solid electrolyte included in the solid electrolyte layer may be a sulfide solid electrolyte.

[Solid Electrolyte Layer: Sulfide Solid Electrolyte]

Figure 3:
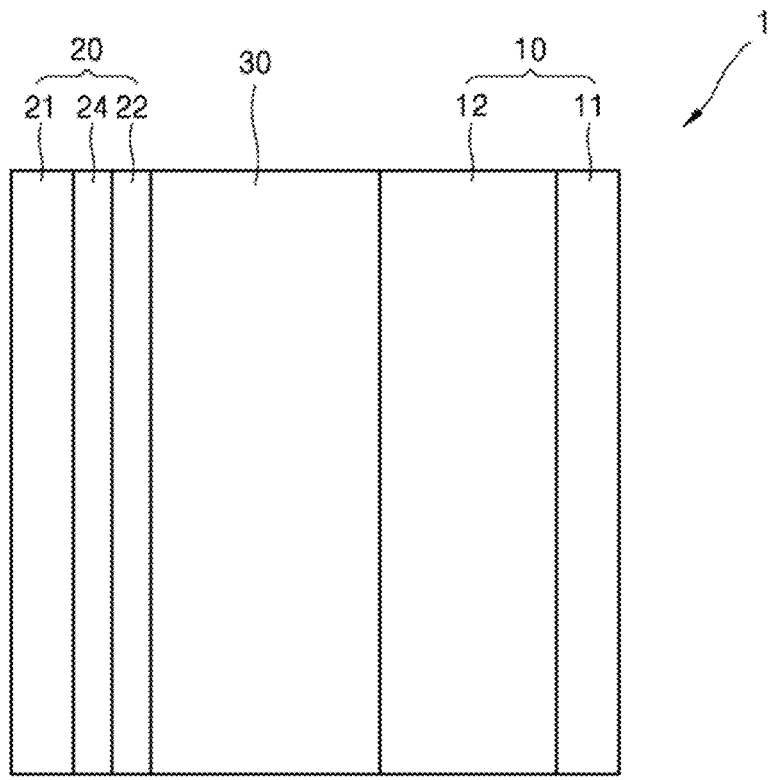
Figure 4:
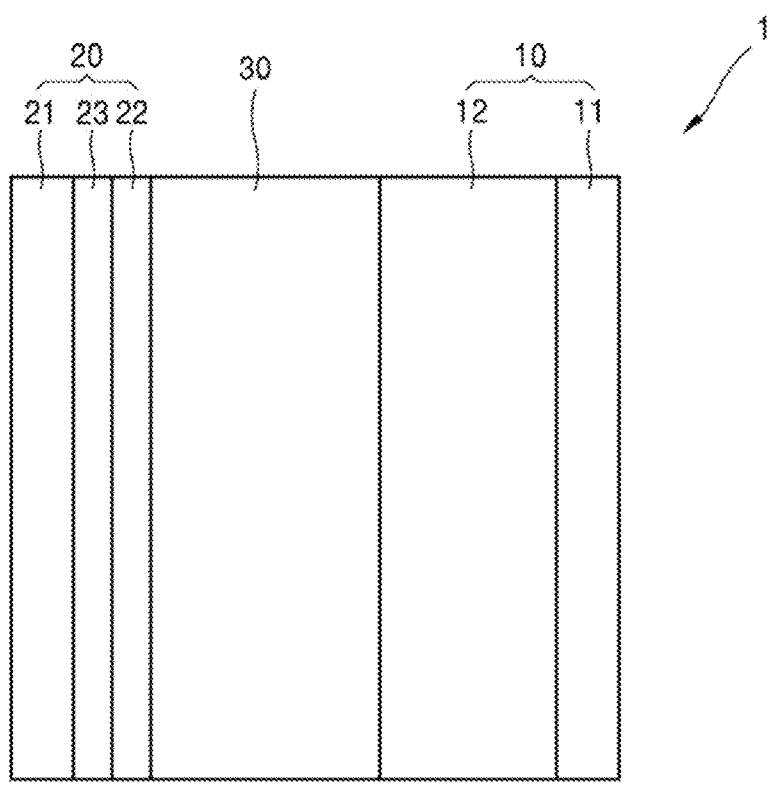

Referring to FIGS. 2 to 4, the solid electrolyte layer 30 may include a sulfide solid electrolyte between the cathode layer 10 and the anode layer 20.

In the all-solid-state battery according to an embodiment, the solid electrolyte layer in a case where the cathode layer includes the sulfide solid electrolyte according to an embodiment may include a suitable sulfide solid electrolyte.

In an implementation, the sulfide solid electrolyte may include, e.g., $Li_2S-P_2S_5$, $Li_2S-P_2S_5-LiX$ (where X is a halogen atom), $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$ (where m and n are positive numbers, and Z is one of Ge, Zn, and Ga), $Li_2S-GeS_2$, $Li_2S-SiS_2-Li_3PO_4$, $Li_2S-SiS_2-Li_pMO_q$ (where p and q are positive numbers, and M is one of P, Si, Ge, B, Al, Ga, and In), $Li_{7-x}PS_{6-x}I_x$ (where $0 \leq x \leq 2$). The sulfide solid electrolyte may be, e.g., prepared by treating a starting material, such as $Li_2S$, $P_2S_5$, and the like by a melting quenching method or a mechanical milling method. Also, after such treatment, heat treatment may be performed. The solid electrolyte may be amorphous or crystalline, or may be in a mixed state. In addition, the solid electrolyte may include, e.g., sulfur (S), phosphorus (P), and lithium (Li), as at least constituent elements of the above-described sulfide solid electrolyte material. In an implementation, the solid electrolyte may be a material including, e.g., $Li_2S$—$P_2S_5$. When $Li_2S$—$P_2S_5$ is included as a sulfide solid electrolyte material for forming the solid electrolyte, a mixing molar ratio of $Li_2S$ to $P_2S_5$ ($Li_2S:P_2S_5$) may be, e.g., in a range of 50:50 to about 90:10.

The sulfide solid electrolyte may be an argyrodite-type compound including, e.g., $Li_{7-x}PS_{6-x}Cl_x$ (where 0≤x≤2), $Li_{7-x}PS_{6-x}Br_x$ (where 0≤x≤2), or $Li_{7-x}Ps_{6-x}I_x$ (where 0≤x≤2). In an implementation, the sulfide solid electrolyte may include an argyrodite-type solid electrolyte including, e.g., $Li_6PS_5Cl$, $Li_6PS_5Br$, or $Li_6PS_5I$.

A density of the sulfide solid electrolyte may be in a range of about 1.5 g/cc to about 2.0 g/cc. When the density of the sulfide solid electrolyte is within the range above, the internal resistance of the all-solid-state battery may be reduced, and penetration of the solid electrolyte by Li may be effectively suppressed.

[Solid Electrolyte Layer: Binder]

The solid electrolyte layer 30 may include, e.g., a binder. In an implementation, the binder included in the solid electrolyte layer 30 may be, e.g., SBR, polytetrafluoroethylene, polyvinylidene fluoride, polyethylene, or the like. A suitable material available as a binder may be used. The binder included in the solid electrolyte layer 30 may be the same as or different from the binders included in the cathode active material layer 12 and the first anode active material layer 22.

[Anode Layer]
[Anode Layer: Anode Active Material]

The anode layer 20 may include the anode current collector 21 and the first anode active material layer 22 on the anode current collector 21. The first anode active material layer 22 may include, e.g., an anode active material and a binder.

The anode active material included in the first anode active material layer 22 may have, e.g., a particle shape. An average particle diameter of the anode active material having a particle shape may be, e.g., about 4 μm or less, about 2 μm or less, about 1 μm or less, or about 900 nm or less. The average particle diameter of the anode active material having a particle shape may be, e.g., in a range of about 10 nm to about 4 μm, about 10 nm to about 2 μm, or about 10 nm to about 900 nm. When the anode active material has the average particle diameter within the ranges above, lithium may be further easily subjected to reversible absorbing and/or desorbing during charge and discharge. The average particle diameter of the anode active material may be, e.g., a median diameter (D50) measured using a laser particle size distribution meter.

The anode active material may include, e.g., a carbon anode active material or a metal or metalloid anode active material.

The carbon anode active material may be, e.g., amorphous carbon. In an implementation, the amorphous carbon may include, e.g., CB, AB, furnace black (FB), KB, graphene, or the like. A suitable material available as amorphous carbon may be used. The amorphous carbon may be carbon that does not have crystallinity or has very low crystallinity, and in this regard, may be distinguished from crystalline carbon or graphite carbon.

In an implementation, the metal or metalloid anode active material may include, e.g., Au, Pt, Pd, Si, Ag, Al, Bi, Sn, or Zn. A suitable material available as a metal or metalloid anode active material capable of forming an alloy or a compound with lithium may be used. In an implementation, nickel (Ni) may not form an alloy with lithium, and it is not a metal anode active material.

The first anode active material layer 22 may include a kind of anode active material from among the anode active materials described above, or a mixture of a plurality of different anode active materials. In an implementation, the first anode active material layer 22 may include only amorphous carbon, or, e.g., Au, Pt, Pd, Si, Ag, Al, Bi, Sn, or Zn. In an implementation, the first anode active material layer 22 may include a mixture of amorphous carbon with, e.g., Au, Pt, Pd, Si, Ag, Al, Bi, Sn, or Zn. In an implementation, a mixing ratio of the amorphous carbon to Au or the like in the mixture may be, e.g., in a range of about 10:1 to about 1:2, about 5:1 to about 1:1, or about 4:1 to about 2:1. The mixing ratio may be determined depending on the characteristics of the required all-solid-state battery 1. When the anode active material has such a composition, the cycle characteristics of the all-solid-state battery 1 may be further improved.

The anode active material included in the first anode active material layer 22 may include, e.g., a mixture of first particles consisting of amorphous carbon and second particles consisting of metal or metalloid. The metal or metalloid may include, e.g., Au, Pt, Pd, Si, Ag, Al, Bi, Sn, Zn, or the like. The metalloid may be, e.g., a semiconductor. An amount of the second particles may be in a range of, e.g., about 8 wt % to about 60 wt %, about 10 wt % to about 50 wt %, about 15 wt % to about 40 wt %, or about 20 wt % to about 30 wt %, based on the total weight of the mixture. When the amount of the second particles is within the ranges above, the cycle characteristics of the all-solid-state battery 1 may be further improved.

[Anode Layer: Binder]

In an implementation, the binder included in the first anode active material layer 22 may include, e.g., SBR, polytetrafluoroethylene, polyvinylidene fluoride, polyethylene, vinylidene fluoride/hexafluoropropylene copolymer, polyacrylonitrile, polymethyl methacrylate, or the like. A suitable material available as a binder may be used. The binder may be used alone, or may be used with a plurality of different binders.

When the first anode active material layer 22 includes the binder, the first anode active material layer 22 may be stabilized on the anode current collector 21. In addition, despite a change in volume or relative position of the first anode active material layer 22, cracking of the first anode active material layer 22 may be suppressed. If the first anode active material layer 22 were to not include a binder, the first anode active material layer 22 could be easily separated from the anode current collector 21. At a portion where the anode current collector 21 is exposed by the separation of the first anode active material layer 22 from the anode current collector 2, the possibility of occurrence of a short circuit increases as the anode current collector 21 may be in contact with the solid electrolyte layer 30. The first anode active material layer 22 may be prepared by, e.g., coating the anode current collector 21 with a slurry in which a material constituting the first anode active material layer 22 is dispersed, and drying the coating. The inclusion of the binder in the first anode active material layer 22 may facilitate stable dispersion of the anode active material in the slurry. In an implementation, when the slurry is applied on the anode current collector 21 by a screen-printing method, clogging of the screen (e.g., clogging by an agglomerate of the anode electrode active material) may be suppressed.

[Anode layer: Other Additives]

In an implementation, the anode active material layer 22 may further include additives, e.g., a filler, a coating agent, a dispersant, an ion conductive auxiliary agent, or the like, as suitably used in an all-solid-state battery 1.

[Structure of Anode Layer]

A thickness of the anode active material layer 22 may be, e.g., about 50% or less, about 40% or less, about 30% or less, about 20% or less, about 10% or less, or about 5% or less, of a thickness of the cathode active material layer 12. The thickness of the anode active material layer 22 may be, e.g., in a range of about 1 μm to about 20 μm, about 2 μm to about 10 μm, or about 3 μm to about 7 μm. If the anode active material layer 22 were to be too thin, lithium dendrites formed between the anode active material layer 22 and the anode current collector 21 could collapse the anode active material layer 22, so that the cycle characteristics of the all-solid-state battery 1 cold be difficult to improve. If the thickness of the anode active material layer 22 were to be excessively increased, the energy density of the all-solid-state battery 1 could be lowered and the internal resistance of the all-solid-state battery 1 by the anode active material layer 22 could be increased, so that the cycle characteristics of the all-solid-state battery 1 could be difficult to improve.

When the thickness of the anode active material layer 22 is decreased, e.g., the charging capacity of the anode active material layer 22 may be also decreased. The charging capacity of the anode active material layer 22 may be, e.g., about 50% or less, about 40% or less, about 30% or less, about 20% or less, about 10% or less, or about 5% or less, of a charging capacity of the cathode active material layer 12. The charging capacity of the anode active material layer 22 may be, e.g., in a range of about 0.1% to about 50%, about 0.1% to about 40%, about 0.1% to about 30%, about 0.1% to about 20%, about 0.1% to about 10%, about 0.1% to about 5%, or about 0.1% to about 2%, with respect to the charging capacity of the cathode active material layer 12. If the charging capacity of the anode active material layer 22 were to be excessively small, the first anode active material layer 22 could become very thin. In this regard, lithium dendrites formed between the anode active material layer 22 and the anode current collector 21 during a repeated charging and discharging process could collapse the first anode active material layer 22, and thus the cycle characteristics of the all-solid-state battery 1 could be difficult to improve. If the charging capacity of the first anode active material layer 22 were to be excessively increased, the energy density of the all-solid-state battery 1 could be lowered and the internal resistance of the all-solid-state battery 1 by the first anode active material layer 22 could be increased, so that the cycle characteristics of the all-solid-state battery 1 could be difficult to improve.

The charging capacity of the cathode active material layer 12 may be obtained by multiplying the charging capacity density (mAh/g) of the cathode active material by the mass of the cathode active material in the cathode active material layer 12. When several types of the cathode active material are used, the charging capacity density is multiplied by the mass for each cathode active material, and the sum of these values is the charging capacity of the cathode active material layer 12. The charging capacity of the anode active material layer 22 is calculated in the same way. That is, the charging capacity of the anode material layer 22 may be obtained by multiplying the charging capacity density (mAh/g) of the anode active material 22 by the mass of the anode active material 22 in anode active material layer 22. When several types of the anode active material are used, the charging capacity density is multiplied by the mass for each anode active material, and the sum of these values is the charging capacity of the anode active material layer 22. Here, the charge capacity densities of the cathode active material and the anode active material are capacities estimated using an all-solid-state half-cell using lithium metal as a counter electrode. The charging capacities of the cathode active material layer 12 and the anode active material layer 22 may be directly measured by measuring the charging capacity using the all-solid-state half-cell. When the measured charge capacity is divided by the mass of each active material, the packed capacity density is obtained. Alternatively, the charging capacities of the cathode active material layer 12 and the anode active material layer 22 may be initial charging capacity measured during the first cycle.

In an implementation, a carbon layer may be further included between the anode active material layer 22 and the solid electrolyte layer 30.

[Anode Layer: Anode Current Collector]

The anode current collector 21 may be formed of, e.g., a material that does not react with lithium or a material that forms neither an alloy nor a compound with lithium. Such a material for forming the anode current collector 21 may be, e.g., copper (Cu), stainless steel, titanium (Ti), iron (Fe), cobalt (Co), nickel (Ni), or the like. A suitable material available as an electrode current collector may be used. A thickness of the anode current collector 21 may be in a range of, e.g., about 1 μm to about 20 μm, about 5 μm to about 15 μm, or about 7 μm to about 10 μm.

The anode current collector 21 may be formed of one of the above-described metals, a coating material, or an alloy or two or more metals. The anode current collector 21 may be, e.g., in the form of a plate or foil.

In an implementation, referring to FIG. 3, the all-solid-state battery 1 may further include, e.g., a thin-film 24 including an element capable of forming an alloy with lithium on the negative electrode current collector 21. The thin-film 24 may be between the anode current collector 21 and the anode active material layer 22. The thin-film 24 may include, e.g., an element capable of forming an alloy with lithium. The element capable of forming an alloy with lithium may include, e.g., gold, silver, zinc, tin, indium, silicon, aluminum, bismuth, or the like. A suitable material available as an element capable of forming an alloy with lithium may be used. The thin-film 24 may be formed of one of these metals or an alloy of several types of metals. By arranging the thin-film 24 on the anode current collector 21, e.g., a precipitated shape of a second anode active material layer precipitated between the thin-film 24 and the anode active material layer 22 may be further flattened, thereby further improving the cyclic characteristics of the all-solid-state battery 1. The anode active material layer 22 may be the first anode active material layer.

A thickness of the thin-film 24 may be, e.g., in a range of about 1 nm to about 800 nm, about 10 nm to about 700 nm, about 50 nm to about 600 nm, or about 100 nm to about 500 nm. If the thickness of the thin film 24 were to be less than 1 nm, a function by the thin film 24 may not be exhibited. If the thin film 24 were to be too thick, the thin film 24 itself could occlude lithium so that an amount of lithium precipitated in the anode layer 20 could decrease, thereby lowering the energy density of the all-solid-state battery 1 and accordingly deteriorating the cycle characteristics of the all-solid-state battery 1. The thin film 24 may be on the anode current collector 21 by, e.g., a vacuum deposition method, a sputtering method, a plating method, or the like. A suitable method capable of forming the thin film 24 may be used.

[Anode Layer: Anode Active Material]

The anode layer 20 may include the anode current collector 21 and the first anode active material layer 22 on the anode current collector 21. The first anode active material layer 22 may include, e.g., an anode active material and a binder.

The anode active material included in the first anode active material layer 22 may have, e.g., a particle shape. An average particle diameter of the anode active material having a particle shape may be, e.g., about 4 μm or less, about 2 μm or less, about 1 μm or less, or about 900 nm or less. The average particle diameter of the anode active material having a particle shape may be, e.g., in a range of about 10 nm to about 4 μm, about 10 nm to about 2 μm, or about 10 nm to about 900 nm. When the anode active material has the average particle diameter within the ranges above, lithium may be further easily subjected to reversible absorbing and/or desorbing during charge and discharge. The average particle diameter of the anode active material may be, e.g., a median diameter (D50) measured using a laser particle size distribution meter.

The anode active material may include, e.g., a carbon anode active material or a metal or metalloid anode active material.

The carbon anode active material may be, e.g., amorphous carbon. The amorphous carbon may include, e.g., CB, AB, FB, KB, graphene, or the like. A suitable material available as amorphous carbon may be used. The amorphous carbon may be carbon that does not have crystallinity or has very low crystallinity, and in this regard, may be distinguished from crystalline carbon or graphite carbon.

The metal or metalloid anode active material may include, e.g., Au, Pt, Pd, Si, Ag, Al, Bi, Sn, or Zn. A suitable material available as a metal or metalloid anode active material capable of forming an alloy or a compound with lithium may be used. For example, nickel (Ni) does not form an alloy with lithium, and it is not a metal anode active material.

The first anode active material layer 22 may include a kind of anode active material from among the anode active materials described above, or a mixture of a plurality of different anode active materials. In an implementation, the first anode active material layer 22 may include only amorphous carbon, or Au, Pt, Pd, Si, Ag, Al, Bi, Sn, or Zn. In an implementation, the first anode active material layer 22 may include a mixture of amorphous carbon with, e.g., Au, Pt, Pd, Si, Ag, Al, Bi, Sn, or Zn. A mixing ratio of the amorphous carbon to Au or the like in the mixture may be, e.g., in a range of about 10:1 to about 1:2, about 5:1 to about 1:1, or about 4:1 to about 2:1. The mixing ratio may be determined depending on the desired characteristics of the all-solid-state battery 1. When the anode active material has such a composition, the cycle characteristics of the all-solid-state battery 1 may be further improved.

The anode active material included in the first anode active material layer 22 may include, e.g., a mixture of first particles consisting of amorphous carbon and second particles consisting of metal or metalloid. The metal or metalloid may include, e.g., Au, Pt, Pd, Si, Ag, Al, Bi, Sn, Zn, or the like. The metalloid may be, e.g., a semiconductor. An amount of the second particles may be in a range of, e.g., about 8 wt % to about 60 wt %, about 10 wt % to about 50 wt %, about 15 wt % to about 40 wt %, or about 20 wt % to about 30 wt %, based on the total weight of the mixture. When the amount of the second particles is within the ranges above, the cycle characteristics of the all-solid-state battery 1 may be further improved.

[Anode Layer: Precipitation Layer]

In an implementation, referring to FIG. 4, the all-solid-state battery 1 may further include, e.g., a second anode active material layer 23 between the anode current collector 21 and the first anode active material layer 22, e.g., by or due to charging.

The second anode active material layer 23 may be a metal layer including Li or a Li alloy. The metal layer may include Li or a Li alloy. In an implementation, the second anode active material layer 23 which is a Li-including metal layer may serve as, e.g., a Li reservoir. The Li alloy may be, e.g., a Li—Al alloy, a Li—Sn alloy, a Li—In alloy, a Li—Ag alloy, a Li—Au alloy, a Li—Zn alloy, a Li—Ge alloy, a Li—Si alloy, or the like. A suitable material alloyable with Li may be used. The second anode active material layer 23 may include, e.g., Li, one of the alloys above, or several kinds of alloys.

In an implementation, a thickness of the second anode active material layer 23 may be, e.g., in a range of about 1 μm to about 1,000 μm, about 1 μm to about 500 μm, about 1 μm to about 200 μm, about 1 μm to about 150 μm, about 1 μm to about 100 μm, or about 1 μm to about 50 μm. If the second anode active material layer 23 were to be excessively thin, the second anode active material layer 23 may have a difficulty in performing a function as a Li reservoir. If the second anode active material layer 23 were to be excessively thick, the all-solid-state battery 1 may have increased mass and volume, so that the cycle characteristics of the all-solid-state battery 1 may be rather deteriorated. The second anode active material layer 23 may be, e.g., a metal foil having a thickness within the ranges above.

In the all-solid-state battery 1, the second anode active material layer 23 may be, e.g., arranged between the anode current collector 21 and the first anode active material layer 22 before assembly of the all-solid-state battery 1, or may be precipitated between the anode current collector 21 and the first anode active material layer 22 by charging after assembly of the all-solid-state battery 1.

When the second anode active material layer 23 is arranged between the anode current collector 21 and the first anode active material layer 22 before assembly of the all-solid-state battery 1, the second anode active material layer 23 is a Li-including metal layer, and thus may serve as a Li reservoir. In addition, in this regard, the all-solid-state battery 1 may including the second anode active material layer 23 may have further improved cycle characteristics. In an implementation, before assembly of the all-solid-state battery 1, a Li foil may be arranged between the anode current collector 21 and the first anode active material layer 22.

When the second anode active material layer 23 is arranged by charging after assembly of the all-solid-state battery 1, the second anode active material layer 23 may not be included at the time of the assembly of the all-solid-state battery 1, and thus the energy density of the all-solid-state battery 1 may increase. In an implementation, when the all-solid-state battery 1 is charged, the charging is performed at a capacity beyond the charging capacity of the first anode active material layer 22. In an implementation, the first anode active material layer 22 may be overcharged. At the beginning of charging, Li may be occluded into the first anode active material layer 22. In an implementation, the anode active material included in the first anode active material layer 22 may form an alloy or compound with Li ions that have migrated from the cathode layer 10. When the charging is performed at a capacity beyond the capacity of the first anode active material layer 22, e.g., Li may be precipitated on a rear surface of the first anode active material layer 22, e.g., a surface between the anode current collector 21 and the first anode active material layer 22. By precipitating Li, a metal layer corresponding to the second anode active material layer 23 may be formed. The second anode active material layer 23 may be a metal layer mainly consisting of or including Li (i.e., metallic or non-compounded Li). Such a result may be obtained, e.g., when the anode active material included in the first anode active material layer 22 consists of or includes a material that forms an alloy or compound with Li. At the time of discharging, Li included in the first anode active material layer 22 and the second anode active material layer 23 which is a metal layer may be ionized and move toward the cathode layer 10. Therefore, Li may be used as the anode active material in the all-solid-state battery 1. In addition, the first anode active material layer 22 may cover the second anode active material layer 23, the first anode active material layer 22 may serve as a protective layer for the second anode active material layer 23 which is a metal layer, and at the same time, may serve as a layer suppressing the precipitation growth of Li dendrite. Therefore, the short circuit and the capacity degradation of the all-solid-state battery 1 may be suppressed, and consequently, the cycling characteristics of the all-solid-state battery 1 may be improved. In an implementation, when the second active material layer 23 is arranged by charging after the assembly of the all-solid-state secondary battery 1, the anode current collector 21, the first anode active material layer 22, and a region therebetween may be, e.g., Li-free regions that do not include Li in an initial state or a post-discharge state of the all-solid-state secondary battery 1.

Next, a method of preparing an all-solid-state battery employing a cathode using the composite cathode active material will be described below.

First, a composition for forming a cathode active material layer may be prepared by mixing a composite cathode active material, a binder, a solid electrolyte, a conductive material, and a solvent.

Then, a cathode layer may be provided by coating a cathode current collector with the composition for forming the cathode active material layer, and drying the cathode current collector to form a cathode active material layer.

In an implementation, the drying may be performed at a temperature in a range of, e.g., about 40° C. to about 60° C.

In an implementation, the method of preparing the all-solid-state battery may include, e.g., providing an anode layer including an anode current collector and a first anode active material layer; preparing a laminate by providing a solid electrolyte layer between the anode layer and the cathode layer; and pressing the laminate.

The solid electrolyte may be a solid electrolyte layer including a sulfide solid electrolyte according to an embodiment.

The pressing may be performed at a temperature in a range of about 25° C. to about 90° C., and at a pressure of about 550 MPa or less, e.g., about 500 MPa or less, and for example, in a range of about 400 MPa to 500 MPa, thereby completing the all-solid-state battery. Here, the pressing time may vary depending on the temperature and pressure and, e.g., may be less than 30 minutes. In an implementation, the pressing may be, e.g., isostatic press, roll press, or plate press.

The all-solid-state battery according to an embodiment may be applicable to a medium or large-sized battery or an energy storage system (ESS).

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparation of Composite Cathode Active Material

Preparation Example 1

First, LiOH was added to ethanol to be dissolved, and then mixed with a cathode active material. Titanium (IV) propoxide and magnesium nitrate were added thereto to be dissolved, to obtain a coating composition. In the composition, regarding the amounts of lithium hydroxide, titanium (IV) propoxide, and magnesium nitrate, a $Li_2MgTi_3O_8$ precursor was coated on a cathode active material particle using a sol-gel synthesis device such that, based on 100 mol % of a finally obtained composite cathode active material, the amount of metal oxide, i.e., $Li_2MgTi_3O_8$, was about 0.067 mol %. Afterwards, while stirring, the coated product was dried at a temperature in a range of about 100° C. to about 150° C. for 2 hours. Here, as the cathode active material particle, an active material particle having a composition of $LiNi_{0.90}Co_{0.07}Mn_{0.03}O_2$ and an average particle diameter was 5 μm, was used.

After the sol-gel reaction was completed, the reaction product was dried at 150° C. for 2 hours to remove the solvent.

The resultant was heat-treated at 300° C. for 4 hours under an oxygen atmosphere to prepare a composite cathode active material in which $Li_2MgTi_3O_8$ was present at the grain boundary on the surface of the secondary particle of the cathode active material. Here, the amount of $Li_2MgTi_3O_8$ was about 0.067 mol % based on 100 mol % of the composite cathode active material.

Preparation Example 2

A composite cathode active material was obtained in the same manner as in Preparation Example 1, except that, in preparing a composition for forming a metal oxide, zinc acetate, which is a zinc precursor, was used instead of magnesium nitrate, and that the amount of each precursor in the composition was adjusted such that the amount of metal oxide ($Li_2Ti_3ZnO_8$) in a finally obtained composite cathode active material was about 0.067 mol % based on 100 mol % of the composite cathode active material.

Using the composite cathode active material of Preparation Example 2, a composite cathode active material including $Li_2Ti_3ZnO_8$ on the surface of the secondary particle of the cathode active material was prepared. Here, the amount of $Li_2Ti_3ZnO_8$ was about 0.067 mol % based on 100 mol % of the composite cathode active material.

Preparation Example 3

A composite cathode active material was obtained in the same manner as in Preparation Example 1, except that, in preparing a composition for forming a metal oxide, trimethyl phosphate, which is a phosphate precursor, was used instead of magnesium nitrate, and that the amount of each precursor in the composition was adjusted such that the amount of metal oxide ($LiTiPO_5$) in a finally obtained composite cathode active material was about 0.125 mol % based on 100 mol % of the composite cathode active material.

Using the composite cathode active material of Preparation Example 3, a composite cathode active material including LiTiPO$_5$ on the surface of the secondary particle of the cathode active Materia was prepared. Here, the amount of LiTiPO$_5$ was about 0.125 mol % based on 100 mol % of the composite cathode active material.

Comparative Preparation Example 1

As a cathode active material, LiNi$_{0.90}$Co$_{0.07}$Mn$_{0.03}$O$_2$ was used.

Comparative Preparation Example 2

A composite cathode active material was obtained in the same manner as in Preparation Example 1, except that the composition for forming the metal oxide was obtained by mixing lithium hydroxide and titanium (IV) propoxide in ethanol. In the composition, regarding the amounts of lithium hydroxide and titanium (IV) propoxide, a Li$_2$O·TiO$_2$ precursor was coated on a cathode active material particle using a sol-gel synthesis device such that, based on 100 mol % of a finally obtained composite cathode active material, the amount of metal oxide, i.e., Li$_2$O·TiO$_2$, was about 0.25 mol %. Then, the resultant was mixed for 15 minutes while stirring. As a cathode active material particle, an active material particle having a composition of LiNi$_{0.90}$Co$_{0.07}$Mn$_{0.03}$O$_2$ and an average particle diameter was 5 μm was used.

The resultant was heat-treated at 300° C. for 4 hours under an oxygen atmosphere to prepare a composite cathode active material including Li$_2$O·TiO$_2$ on the surface of the secondary particle of the cathode active material. Here, the amount of Li$_2$O·TiO$_2$ was about 0.25 mol % based on 100 mol % of the composite cathode active material.

Comparative Preparation Example 3

First, lithium hydroxide and magnesium nitrate were mixed in ethanol to obtain a composition for forming a metal oxide. In the composition, regarding the amounts of lithium hydroxide and magnesium nitrate, a Li$_2$O·MgO precursor was coated on a cathode active material particle using a sol-gel synthesis device such that, based on 100 mol % of a finally obtained composite cathode active material, the amount of metal oxide, i.e., Li$_2$O·MgO, was about 0.25 mol %. Then, the resultant was mixed for 15 minutes while stirring. Here, as the cathode active material particle, an active material particle having a composition of LiNi$_{0.90}$Co$_{0.07}$Mn$_{0.03}$O$_2$ and an average particle diameter was 5 μm was used.

The resultant was heat-treated at 300° C. for 4 hours under an oxygen atmosphere to prepare a composite cathode active material including Li$_2$O·MgO on the surface of the secondary particle of the cathode active material. Here, the amount of Li$_2$O·MgO was about 0.25 mol % based on 100 mol % of the composite cathode active material.

Comparative Preparation Example 4

First, lithium hydroxide and zinc acetate, as a zinc precursor, were mixed in ethanol to obtain a composition for forming a metal oxide. In the composition, regarding the amounts of lithium hydroxide and zinc acetate, a Li$_2$O·ZnO precursor was coated on a cathode active material particle using a sol-gel synthesis device such that, based on 100 mol % of a finally obtained composite cathode active material, the amount of metal oxide, i.e., Li$_2$O·ZnO, was about 0.25 mol %. Then, the resultant was mixed for 15 minutes while stirring. Here, as the cathode active material particle, an active material particle having a composition of LiNi$_{0.90}$Co$_{0.07}$Mn$_{0.03}$O$_2$ and an average particle diameter was 5 μm was used.

The resultant was heat-treated at 300° C. for 4 hours under an oxygen atmosphere to prepare a composite cathode active material including Li$_2$O·ZnO on the surface of the secondary particle of the cathode active material. Here, the amount of Li$_2$O·ZnO was about 0.25 mol % based on 100 mol % of the composite cathode active material.

Preparation of All-Solid-State Battery

Example 1

Preparation of Cathode Layer

As a cathode active material, the composite cathode active material was prepared. As a solid electrolyte, a crystalline argyrodite-type solid electrolyte (Li$_6$PS$_5$Cl) was used. In addition, polytetrafluoroethylene (PTFE) (Teflon binder manufactured by DuPont Company) was prepared as a binder, and a carbon nanofiber (CNF) was prepared as a conductive agent. The cathode active material, the solid electrolyte, the CNF, and the binder were mixed first at a weight ratio of 86.91:11.85:0.25:0.99, and the mixture was added to octyl acetate (which is a dispersant), so as to prepare a composition for forming a cathode active material layer. The total weight of the solid cathode active material layer represents the total weight of the cathode active material, the solid electrolyte, the CNF, and the binder.

After the composition for forming the cathode active material layer was formed into a sheet, a first heat treatment process was performed thereon in a convection oven at 40° C. for 2 hours, and then dried. Subsequently, a second heat treatment process was performed thereon in a vacuum oven at 80° C. for 12 hours, and then dried to prepare a cathode layer.

Preparation of Anode Layer

As an anode current collector, a Ni foil having a thickness of 10 μm was prepared. In addition, as anode active materials, carbon black (CB) having an average particle diameter of about 30 nm and Ag particles having an average particle diameter of about 60 nm were prepared.

0.25 g of a mixed powder (in which CB and Ag particles were mixed at a weight ratio of 3:1) was added to a container, and 2 g of a N-methylpyrrolidone (NMP) solution containing 7 wt % of a polyvinylidene fluoride (PVDF) binder (#9300, Kureha Corporation) was added thereto to prepare a mixed solution. Then, a slurry was prepared by stirring the mixed solution while adding NMP little by little to the mixed solution. The prepared slurry was applied onto the Ni foil using a bar coater, and dried in a convection oven at 80° C. for 10 minutes to obtain a laminate. The laminate thus obtained was vacuum-dried at 100° C. for 8 hours to 10 hours. According to the process described above, an anode layer in which a first anode active material layer was formed on an anode current collector was prepared.

Preparation of Solid Electrolyte Layer 4 wt % of a binder solution was prepared by adding an acrylic binder (SX-A334, Zeon Co., Ltd.) to octyl acetate. A slurry was prepared by adding the prepared acrylic binder solution to an argyrodite solid electrolyte ($Li_6PS_5Cl$) (D50=3 μm, crystalline) and mixing with a Thinky mixer. The slurry included 1.5 parts by weight of the acrylic binder with respect to 98.5 parts by weight of the solid electrolyte. The slurry was applied onto a non-woven fabric using a bar coater, and then dried in a convection oven at 50° C. for 5 minutes to obtain a laminate. The laminate thus obtained was dried in a vacuum oven at 40° C. for at least 10 hours. As such, a solid electrolyte layer was prepared by the process described above.

Preparation of All-Solid-State Battery

The solid electrolyte layer was arranged between the cathode layer and the anode layer to prepare a laminate. The laminate thus prepared was subjected to a hot-plate pressing process at 80° C. under a pressure of 500 MPa for 10 minutes to prepare an all-solid-state battery. The solid electrolyte layer was sintered by the pressing process, thereby improving battery characteristics. The thickness of the pressed cathode active material layer was about 80 μm, the thickness of the anode active material layer was 7 μm, and the thickness of the solid electrolyte layer was 60 μm.

Examples 2 and 3

An all-solid-state battery was manufactured in the same manner as in Example 1, except that, in preparing a cathode layer, the composite cathode active material of each of Preparation Example 2 and Preparation Example 3 was used instead of the composite cathode active material of Preparation Example 1.

Comparative Example 1

An all-solid-state battery was prepared in the same manner as in Example 1, except that, in forming a cathode layer, the cathode active material ($LiNi_{0.90}Co_{0.07}Mn_{0.03}O_2$) of Comparative Preparation Example 1 was used instead of the composite cathode active material of Preparation Example 1.

Comparative Examples 2 to 4

All-solid-state batteries were prepared in the same manner as in Example 1, except that, in forming a cathode layer, the composite cathode active materials of Comparative Preparation Examples 2, 3, and 4 were respectively used instead of the composite cathode active material of Preparation Example 1.

Evaluation Example 1: Discharge Capacity

For use as a cathode of a torque cell, a composite cathode active material, a solid electrolyte, and carbon nanofiber were mixed at a weight ratio of 60:35:5 to prepare a composition.

The composition was uniformly distributed on a solid electrolyte filled in a torque cell having a diameter of 13 mm.

For use as an anode, a Li metal having a thickness of about 20 μm and an In metal having a thickness of 50 μm were used.

For use as a solid electrolyte, an argyrodite solid electrolyte ($Li_6PS_5Cl$) (D50=3 crystalline) filled a torque cell having a diameter of 13 mm.

The solid electrolyte was arranged between the cathode and the anode to prepare a torque cell.

The torque cell was pressurized at a pressure of 40 kN for 1 minute to maximize the interfacial contact. Here, the pressing force for the torque cell was set to be 4N·m.

The torque cell was subjected to electrochemical evaluation at 45° C. as follows. First, regarding the theoretical capacity, the cell was charged with a constant current of 0.1 C until a voltage reached 4.25 V with respect to a Li anode, and then discharged with a constant current of 0.1 C to a lower limit voltage of 2.5 V, so as to evaluate the discharge capacity. The results of evaluation are shown in Table 1.

Evaluation Example 2: Discharge Current Characteristics

Using all-solid-state batteries of Examples 1 to and Comparative Examples 1 to 4, a cycle of charging and discharging was performed once at 45° C., 2.5 V to 4.25 V, 0.1 C-rate and 1 C-rate, respectively, and changes in the discharge capacity in each case were measured therefrom.

The discharge current characteristics are shown in Table 1 by calculation according to Equation 1:

Discharge current characteristic (%)=(discharge capacity at 1 C/discharge capacity at 0.1 C) X100      Equation 1

Evaluation Example 3: Interfacial Resistance

The resistance for each all-solid-state battery of Examples 1 to 3 and Comparative Examples 1 to 3 was measured by electrochemical impedance spectroscopy (EIS), and the interfacial resistance was confirmed through the points where the semicircular line intersects the x-axis in the obtained graph. The interfacial resistance between the cathode and the sulfide solid electrolyte was shown in Table 1 below:

TABLE 1

| Division | Buffer layer composition | Discharge capacity (mAh/g) | Discharge current characteristics (%, 1 C/0.1 C) | Interfacial resistance (Ω) |
|---|---|---|---|---|
| Example 1 | $Li_2MgTi_3O_8$ | 192 | 87.9 | 17 |
| Example 2 | $Li_2Ti_3ZnO_8$ | 195 | 88.5 | 25 |
| Example 3 | $LiTiPO_5$ | 186 | 87.4 | 31 |
| Comparative Example 1 | — | 198 | 79.7 | 332 |
| Comparative Example 2 | $Li_4Ti_5O_{12}$ | 191 | 85.7 | 40 |
| Comparative Example 3 | $Li_2MgO_2$ ($Li_2O$•$MgO$) | 188 | 81/1 | 248 |
| Comparative Example 4 | $Li_2ZnO_2$($Li_2O$•$ZnO$) | 192 | 85.1 | 44 |

As may be seen in Table 1, the all-solid-state batteries of Examples 1 to 3 had small interfacial resistance, high discharge capacity, and excellent discharge current characteristics, whereas the all-solid-state batteries of Comparative Examples 1 to 4 had large interfacial resistance against lithium discharge capacity that was not sufficiently expressed, and poor discharge current characteristic, compared to Examples 1 to 3.

Evaluation Example 4: High-Voltage Stability

The electrochemical stability and reactivity with respect to the Li metal of the metal oxides of Preparation Examples 1 to 4 and Comparative Preparation Example 3 were calculated, and the results are shown in Table 2 below.

The stable electrochemical window with respect to the Li metal represents a voltage range in which the solid electrolyte is not oxidized or reduced, and in the case of the buffer layer used for the cathode, the higher the oxidized voltage, the more stable it was. The voltage at which the $Li_2ZrO_3$ buffer layer was oxidized may be obtained from the reaction equation in which the buffer layer was oxidized as shown below:

$$2Li_2ZrO_3 \rightarrow 2ZrO_2 + 4Li + O_2$$

The voltage at which the buffer layer was oxidized based on the reaction equation above may be calculated based on the framework of density functional theory (DFT), and may be obtained by direct calculation utilizing a public database based on the DFT such as the Materials Project (www.materialsproject.org) or using the Vienna ab initio simulation package (VASP). The electrochemical window was calculated in the same manner not only for the $Li_2ZrO_3$ buffer layer, but also for other buffer layers.

Evaluation Example 5: Electrolyte Reactivity

The electrolyte reactivity of the metal oxides of Preparation Examples 1 to 3 was calculated as follows.

A method of calculating the electrolyte reactivity of the metal oxide was based on the framework the DFT in the same way as the electrochemical window calculation method.

The calculation results of the stability with the electrolyte are shown in Table 2 below:

In Table 2, the electrochemical window was calculated according to the method based on the DFT.

TABLE 2

| Division | Metal oxide | Electrochemical window (V) | Redox potential (V) | Electrolyte Reactivity (eV/atom) |
|---|---|---|---|---|
| Li—Zr—O (baseline) | $Li_2ZrO_3$ | 3.41 | 4.65 | −0.103 |
| Comparative Preparation Example 3 | $Li_4Ti_5O_{12}$ | 3.71 | 4.84 | −0.077 |
| Preparation Example 1 | $Li_2MgTi_3O_8$ | 3.70 | 5.45 | −0.057 |
| Preparation Example 2 | $Li_2Ti_3ZnO_8$ | 3.89 | 6.09 | −0.088 |
| Preparation Example 3 | $LiTiPO_5$ | 5.34 | 5.14 | −0.063 |

In Table 2, the electrochemical window refers to a parameter related to the buffer layer decomposition potential, and the higher value represents more stable characteristics. In addition, as the absolute value of the electrolyte reactivity decreased, the occurrence of a side reaction between cathode active material and the sulfide solid electrolyte also decreased, resulting in the improved electrolyte reaction stability.

Referring to Table 2, the metal oxides of Preparation Examples 2 and 3 had high buffer layer decomposition potential with respect to the Li metal, compared to the metal oxide and $Li_2O \cdot TiO_2$ of Comparative Preparation Example 3, thereby improving the stability. Accordingly, it may be seen that low reactivity to the electrolyte resulted excellent stability.

Although the metal oxide of Preparation Example 1 had a slightly low buffer layer decomposition potential compared to the metal oxide of Comparative Preparation Example 3, the redox potential and electrolyte stability of the metal oxide of Preparation Example 1 were significantly improved.

In contrast, the metal oxide of Comparative Preparation Example 3 exhibited a stable electrochemical window with respect to the Li metal, but exhibited poor electrolyte reaction stability compared to the metal oxides of Preparation Examples 1 to 3. In addition, as shown in Table 3, it may be that the metal oxides of Preparation Examples 1 and 2 included Ti, thereby having excellent redox potential in particular.

Evaluation Example 6: ICP Analysis

To find out the amount of elements included in the buffer layer of the composite cathode active material of each of Preparation Examples 1 to 3 and Comparative Preparation Example 3, a method based on Inductively Coupled Plasma Spectroscopy (ICP) was used for analysis as follows. As an ICP analysis device, ICP-AES (ICP 5300 DV, Perkin Elmer) was used.

0.1 g each of the composite cathode active material was added, and 2 ml of distilled water and 3 ml of concentrated nitric acid were added thereto. Then, the mixed solution was sealed with a lid, and a sample was dissolved therein. When the sample was completely dissolved, 50 ml of ultrapure water was added thereto for dilution. Afterwards, the diluted solution was diluted 10 more times, and then subjected to the ICP analysis. The ICP analysis was operated under the following conditions: Forward Power of 1,300 W; Torch Height of 15 mm; Plasma gas flow of 15.00 L/min; sample gas flow if 0.8 L/min; Auxiliary gas flow of 0.20 L/min and pump speed of 1.5 ml/min. As a result, the amounts of the elements included in the buffer layer of the composite cathode active material are shown in Tables 3 and 4 below:

TABLE 3

| Buffer layer condition | | | ICP-AES, wt % | | | | | | | | | |
|---|---|---|---|---|---|---|---|---|---|---|---|---|
| | | (mol % based) | Li | Ni | Co | Mn | Mg | P | Ti | Zn | Na | S |
| Preparation Example 1 | 0.067 mol % $Li_2MgTi_3O_8$ | 0.25% $Li_2O$ + 0.20% $TiO_x$ + 0.05% $MgO_x$ | 7.18 | 51.34 | 4.04 | 1.63 | 0.013 | 0 | 0.104 | 0.25 | 0.02 | 0.104 |
| Preparation Example 2 | 0.067 mol % $Li_2Ti_3ZnO_8$ | 0.25% $Li_2O$ + 0.20% $TiO_x$ + 0.05% $ZnO_x$ | 7.25 | 51.51 | 4.14 | 1.64 | 0 | 0 | 0.097 | 0.3 | 0.024 | 0.107 |
| Preparation Example 3 | 0.125 mol % $LiTiPO_5$ | 0.25% $Li_2O$ + 0.125% $TiO_x$ + 0.125% $PO_x$ | 7.15 | 51.13 | 4.09 | 1.63 | 0 | 0.03 | 0.063 | 0.26 | 0.042 | 0.108 |

TABLE 4

| Buffer layer condition | | ICP-AES, mole, Ni + Co + Mn = 1 | | | | | | |
|---|---|---|---|---|---|---|---|---|
| | (mol % based) | Li | Ni | Co | Mn | Mg | P | Ti | Zn |
| Preparation Example 1 Li$_2$MgTi$_3$O$_8$ | 0.25% Li$_2$O + 0.20% TiO$_x$ + 0.05% MgO$_x$ | 1.06 | 0.899 | 0.070 | 0.030 | 0.0005 | — | 0.0022 | 0.0039 |
| Preparation Example 2 Li$_2$Ti$_3$ZnO$_8$ | 0.25% Li$_2$O + 0.20% TiO$_x$ + 0.05% ZnO$_x$ | 1.07 | 0.898 | 0.072 | 0.031 | — | — | 0.0021 | 0.0047 |
| Preparation Example 3 LiTiPO$_5$ | 0.25% Li$_2$O + 0.125% TiO$_x$ + 0.125% PO$_x$ | 1.06 | 0.898 | 0.072 | 0.031 | — | 0.0010 | 0.0014 | 0.0041 |

Referring to Tables 3 and 4, it may be that, in Preparation Examples 1 to 3, Na and S were derived from impurities remaining in the sulfate raw material and NaOH, which is a precipitant, respectively, and Zn was an element doped from the beginning on a cathode material. Also, referring to Table 4, it may be seen that, in Preparation Examples 1 to 3, Zn was an element doped from the beginning on a cathode material.

As shown in Tables 3 and 4, it may be seen that element Ti was detected in the composite cathode materials of Preparation Examples 1 and 2, and Zr and Ti were detected in the cathode active material of Preparation Example 2. In addition, it may be seen that, when carried out according to Preparation Examples 1 to 3, the amount (experimental value) of the metal oxide present in the composite cathode active material was similar to the theoretical value.

Evaluation Example 7: Charge/Discharge Test

The charge/discharge characteristics of the all-solid-state batteries of Examples 1 to 3 and Comparative Examples 1 to 4 were evaluated by the following charge/discharge test.

The battery was charged with a constant current of 0.1 C for 10 hours until the battery voltage reached 4.25 V, and then discharged with a constant current of 0.1 C for 10 hours until the battery voltage reached 2.5 V (first cycle). Subsequently, the battery was charged with a constant current of 0.1 C for 10 hours until the battery voltage reached 4.25 V, and then discharged with a constant current of 0.33 C for 3 hours until the battery voltage reached 2.5 V (second cycle). Afterwards, the battery was charged with a constant current of 0.1 C for 10 hours until the battery voltage reached 4.25 V. Subsequently, the battery was discharged with constant current of 1 C for 1 hour until the battery voltage reached 2.5 V (third cycle).

Afterwards, the battery was charged with a constant current of 0.33 C for 3 hours until the battery voltage reached 4.25 V. Subsequently, the battery was discharged with constant current of 0.33 C for 3 hours until the battery voltage reached 2.5 V (fourth cycle).

Such a cycle was repeated a total of 50 times.

Then, the average voltage, lifespan characteristics, and capacity characteristics were investigated after repeating the cycle.

As a result of evaluating the above-described characteristics, it may be seen that the all-solid-state batteries of Examples 1 to 3 had excellent characteristics in terms of capacity and discharge current characteristics, compared to the batteries of Comparative Examples 1 to 3.

Figure 5A:
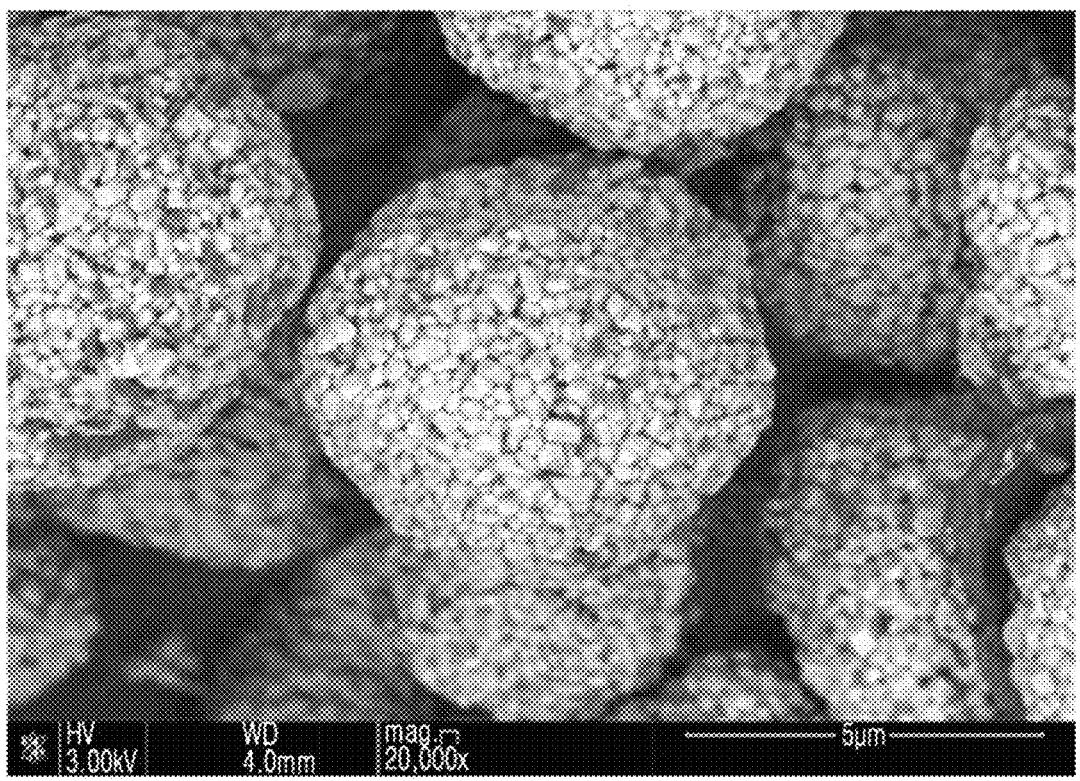
FIGS. 5A and 5B are scanning electron microscope (SEM) analysis images of a composite cathode active material of Example 1.
Figure 5B:
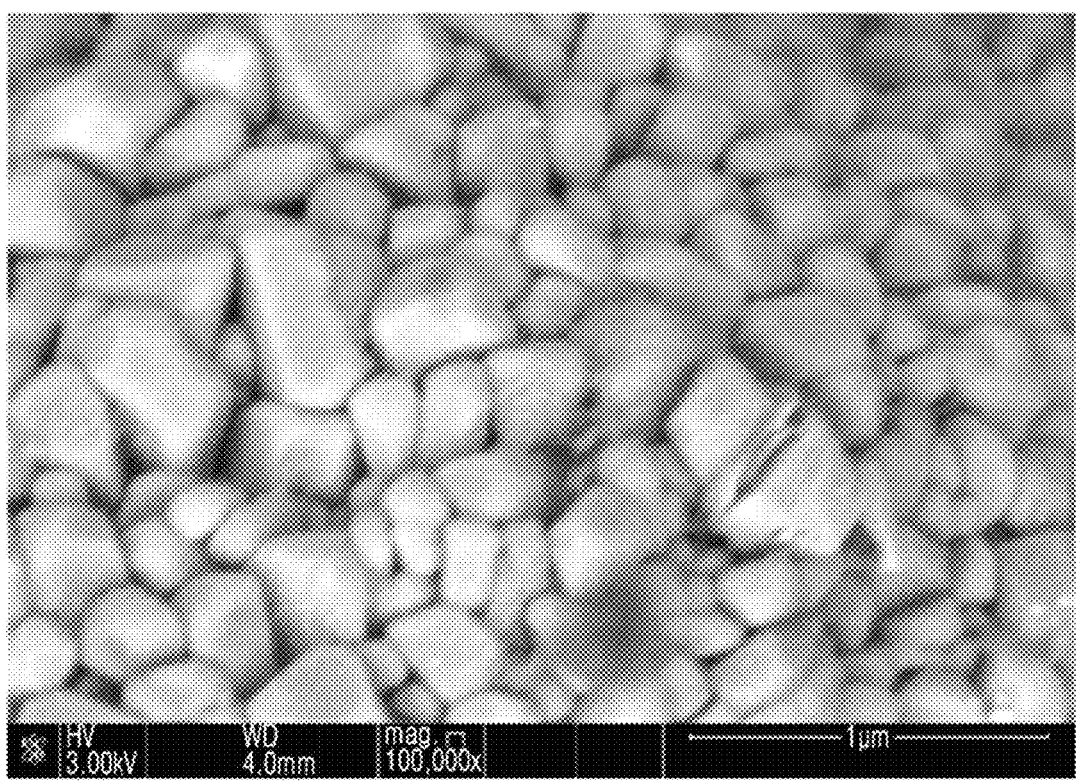
Figure 6A:
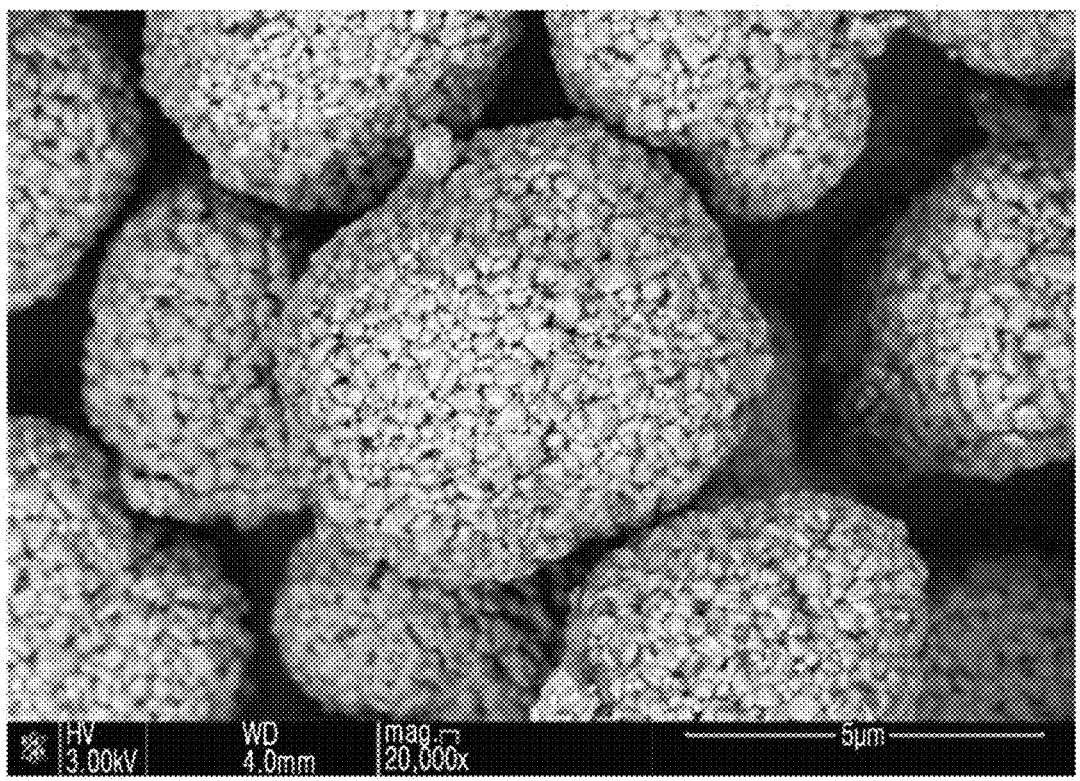
FIGS. 6A and 6B are SEM analysis images of a composite cathode active material of Example 2.
Figure 6B:
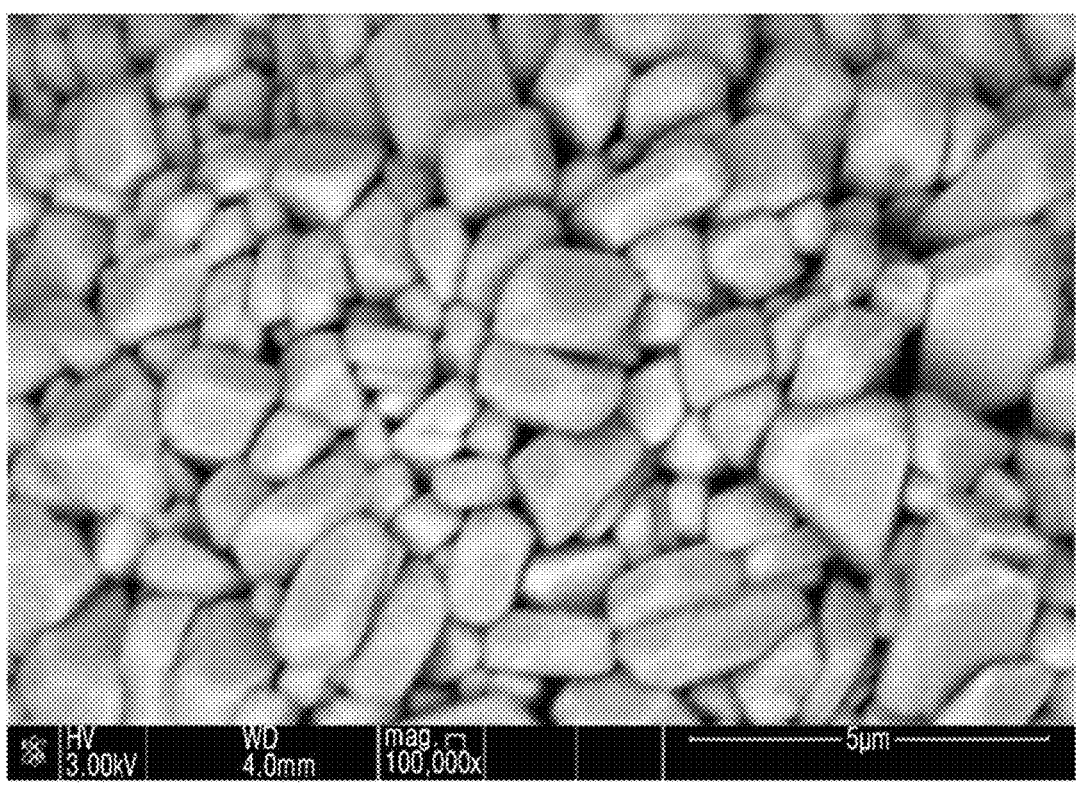
Figure 7A:
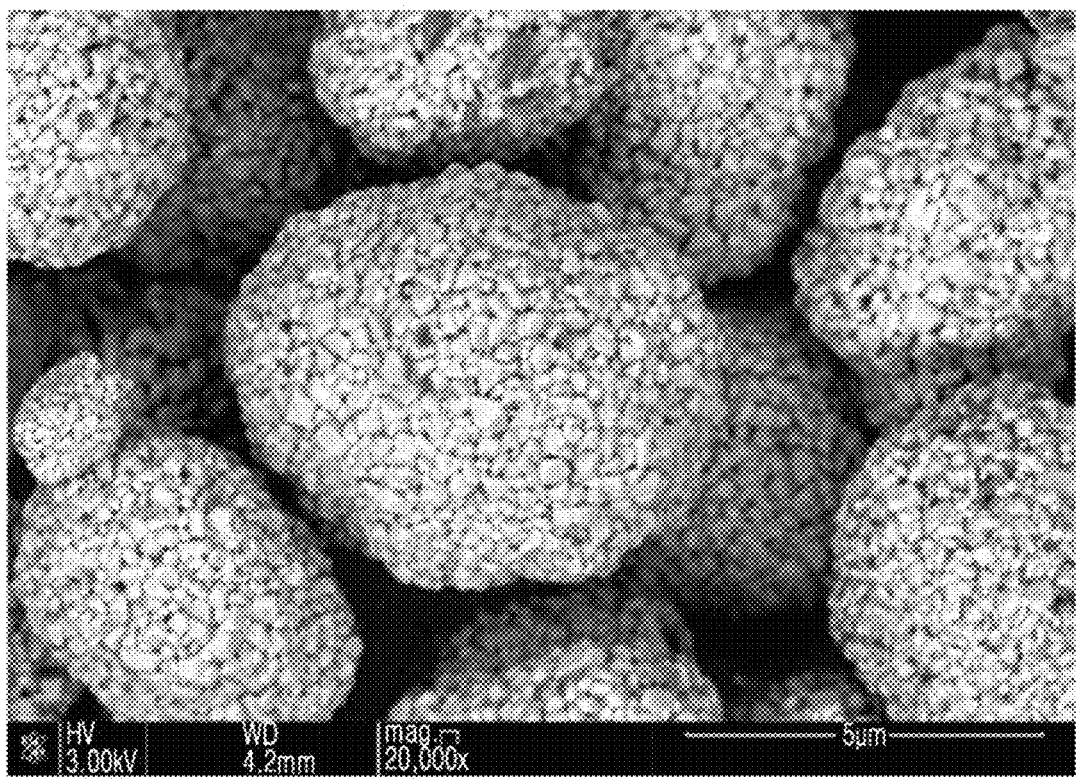
FIGS. 7A and 7B are SEM analysis images of a composite cathode active material of Example 3.
Figure 7B:
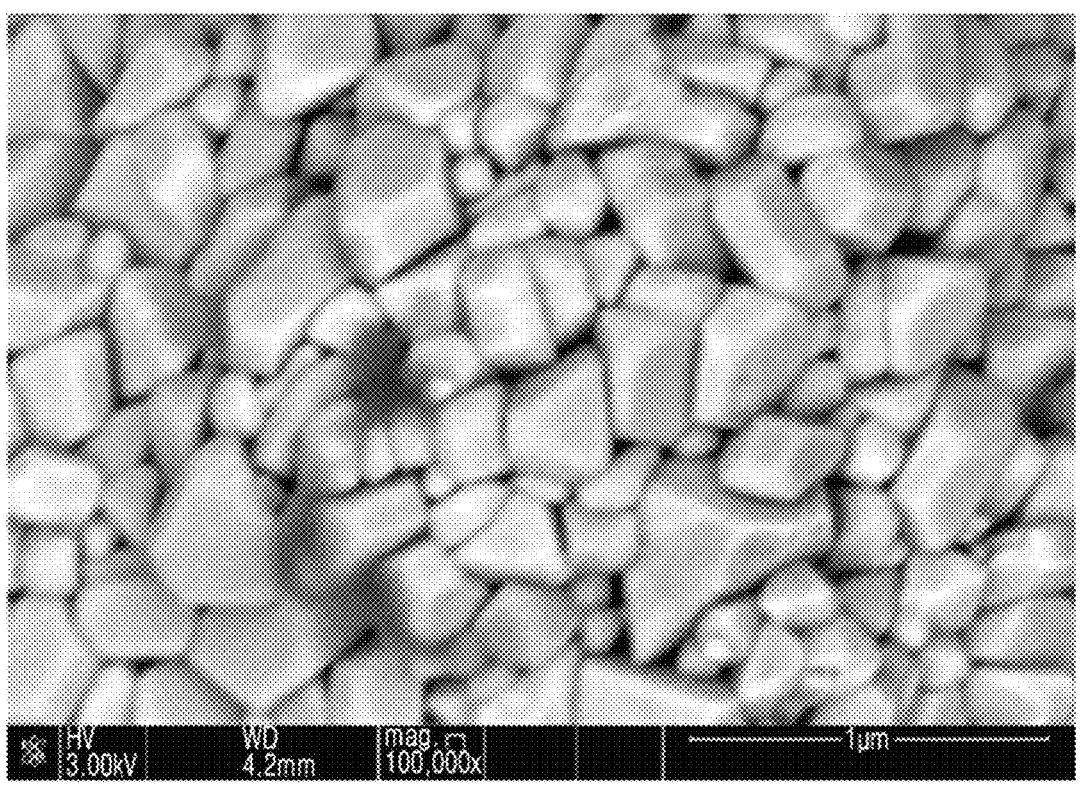

SEM analysis was performed on the composite cathode active materials of Examples 1 to 3. The SEM analysis results for the composite cathode active material of Example 1 are shown in FIGS. 5A and 5B, and the SEM analysis results for the composite cathode active materials of Example 2 are shown in FIGS. 6A and 6B. In addition, the SEM analysis results for the composite cathode active material of Example 3 are shown in FIGS. 7A and 7B.

Referring to the results, it may be seen that the composite cathode active material of Examples 1 to 3 had a spherical shape including a secondary particle including a plurality of primary particles and a buffer layer on a surface of the secondary particle.

By way of summation and review, some lithium-ion batteries may use an electrolytic solution containing a flammable organic dispersion medium, and thus overheating and fire could occur in the case of a short circuit. In this regard, all-solid-state batteries using a solid electrolyte instead of an electrolytic solution have been considered.

All-solid-state batteries do not use a flammable organic dispersion medium, and thus the possibility of fire or explosion may be greatly reduced even in the case of a short circuit. Therefore, such all-solid-state batteries may have significantly increased stability compared to lithium-ion batteries using an electrolytic solution.

For use as a solid electrolyte of an all-solid-state battery, a sulfide solid electrolyte having excellent lithium-ion conductivity may be used.

When a sulfide solid electrolyte is in contact with some oxide active materials, the interfacial resistance may be significantly increased due to interfacial reactions such as formation of a resistance layer by diffusion of metal elements or formation of a lithium-deficient layer by a potential difference, thereby significantly degrading cycle and rate characteristics. The performance of some sulfide solid electrolytes may be deteriorated by a reaction with a cathode.

As described above, according to the one or more embodiments, a composite cathode active material for an all-solid-state battery may have improved stability for a reaction with a sulfide solid electrolyte as well as excellent high-voltage stability. When such a composite cathode active material is used, an all-solid-state battery having excellent discharge current characteristics and improved capacity and lifespan characteristics may be prepared.

One or more embodiments may provide a composite cathode active material for an all-solid-state secondary battery.

One or more embodiments may provide an all-solid-state battery having improved performance by including a composite cathode active material.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A composite cathode active material for an all-solid-state battery that includes a sulfide solid electrolyte, the composite cathode active material comprising:
a secondary particle including a plurality of primary particles; and
a buffer layer on a surface of the secondary particle,
wherein:
the secondary particle includes a nickel lithium transition metal oxide represented by Formula 1, and
the buffer layer includes a metal oxide represented by Formula 2-2, $$Li_aNi_{1-b}M_bO_2 \qquad \text{Formula 1}$$

in Formula 1,
M is cobalt (Co), manganese (Mn), aluminum (Al), or a combination thereof, and
a and b satisfy the following relations: $0.95 \leq a \leq 1.10$, $0 < b < 0.5$, and $$Li_xAl_{y1}Zn_{y2}O_z \qquad \text{Formula 2-2}$$

in Formula 2-2,
Al is Ti, Zr, or a combination thereof, and
x, y1, y2, and z satisfy the following relations: $1 \leq x \leq 3$, $1 \leq y1 \leq 4$, $1 \leq y2 \leq 4$, and $0 < z \leq 8$.

2. The composite cathode active material as claimed in claim 1, wherein Al in Formulae 2-2 is Ti.

3. The composite cathode active material as claimed in claim 1, wherein the metal oxide represented by Formula 2-2 includes $Li_2Ti_3ZnO_8$, $Li_2Zr_3ZnO_8$, or a combination thereof.

4. The composite cathode active material as claimed in claim 1, wherein:
the nickel lithium transition metal oxide represented by Formula 1 has a layered crystal structure, and
the metal oxide represented by Formula 2-2 has a cubic crystal structure or an orthorhombic crystal structure.

5. The composite cathode active material as claimed in claim 1, wherein the metal oxide represented by Formula 2-2 is included in the composite cathode active material in an amount of about 0.01 mol % to about 5 mol % based on 100 mol % of the composite cathode active material.

6. The composite cathode active material as claimed in claim 1, wherein, according to inductively coupled plasma (ICP) analysis for the composite cathode active material, the composite cathode active material includes:
Ti in an amount of about 0.1 mol % to about 5 mol %,
Mg in an amount of about 0.01 mol % to about 5 mol %, and
Zn in an amount of about 0.1 mol % to about 5 mol %, all mol % being based on 100 mol % of the composite cathode active material.

7. The composite cathode active material as claimed in claim 1, wherein:
the nickel lithium transition metal represented by Formula 1 is a compound represented by Formula 1-1, a compound represented by Formula 1-2, or a combination thereof:

$$Li_aNi_{1-b1-b2}Co_{b1}Mn_{b2}O_2 \qquad \text{Formula 1-1}$$

in Formula 1-1, a, b1, and b2 satisfy the following relations: $0.95 \leq a \leq 1.10$, $0 < b1+b2 < 0.5$, $0 < b1 < 0.2$, and $0 < b2 < 0.2$, and $$Li_aNi_{1-b1-b2}Co_{b1}Al_{b2}O_2 \qquad \text{Formula 1-2}$$

in Formula 1-1, a, b1, and b2 satisfy the following relations: $0.95 \leq a \leq 1.10$, $0 < b1+b2 < 0.5$, $0 < b1 < 0.2$, and $0 < b2 < 0.05$.

8. A cathode layer for an all-solid-state battery, comprising the composite cathode active material as claimed in claim 1.

9. An all-solid-state battery, comprising:
a cathode layer;
an anode layer; and
a solid electrolyte layer therebetween,
wherein the cathode layer includes the composite cathode active material as claimed in claim 1.

10. The all-solid-state battery as claimed in claim 9, wherein:
the anode layer includes an anode current collector and a first anode active material layer,
the all-solid-state battery further includes a second anode active material layer on the first anode active material layer, between the anode current collector and the first anode active material layer, or a combination thereof, and
the second anode active material layer includes lithium or a lithium alloy.

11. The all-solid-state battery as claimed in claim 9, wherein:
the anode layer includes an anode current collector and a first anode active material layer, and
the all-solid-state battery further includes a carbon layer between the first anode active material layer and the solid electrolyte layer.

12. The all-solid-state battery as claimed in claim 9, wherein:
the solid electrolyte layer includes a sulfide solid electrolyte, and
the sulfide solid electrolyte includes $Li_2S-P_2S_5$, $Li_2S-P_2S_5-LiX$, in which X is a halogen element, $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$, in which m and n are positive numbers, and Z is germanium (Ge), Zn, or gallium (Ga), $Li_2S-GeS_2$, $Li_2S-SiS_2-Li_3PO_4$, $Li_2S-SiS_2-Li_pMO_q$, in which p and q are positive numbers, and M is P, Si, Ge, B, Al, Ga, or indium (In), $Li_{7-x}PS_{6-x}Cl_x$, in which $0 \leq x \leq 2$, $Li_{7-x}PS_{6-x}Br_x$, in which $0 \leq x \leq 2$, or $Li_{7-x}PS_{6-x}I_x$, in which $0 \leq x \leq 2$.

13. The all-solid-state battery as claimed in claim 9, wherein:
the solid electrolyte layer includes a sulfide solid electrolyte, and
the sulfide solid electrolyte is an argyrodite-type solid electrolyte including $Li_6PS_5Cl$, $Li_6PS_5Br$, or $Li_6PS_5I$.

14. A method of preparing the composite cathode active material as claimed in claim 1, the method comprising:
mixing a nickel lithium transition metal oxide represented by Formula 1 and a precursor of a metal oxide represented by Formula 2-2 to obtain a composite cathode active material composition; and
performing a reaction on the composite positive electrode active material composition, and drying and heat-treating the reaction product to a prepare the composite cathode active material, $$Li_aNi_{1-b}M_bO_2 \qquad \text{Formula 1}$$

wherein, in Formula 1,

M is cobalt (Co), manganese (Mn), aluminum (Al), or a combination thereof, and a and b satisfy the following relations: $0.95 \leq a \leq 1.10$, $0 < b < 0.5$, and $$Li_x A1_{y1} Zn_{y2} O_z \qquad \text{Formula 2-2}$$

wherein, in Formula 2-2,

A1 is Ti, Zr, or a combination thereof, and x, y1, y2, and z satisfy the following relations: $1 \leq x \leq 3$, $1 \leq y1 \leq 4$, $1 \leq y2 \leq 4$, and $0 < z \leq 8$.

15. The method as claimed in claim 14, wherein the heat treatment is performed at a temperature in a range of about 300° C. to about 700° C. under an oxidizing atmosphere.

* * * * *